US008126482B2

(12) United States Patent
Teague et al.

(10) Patent No.: US 8,126,482 B2
(45) Date of Patent: Feb. 28, 2012

(54) MULTIPLE PAGING CHANNELS FOR EFFICIENT REGION PAGING

(75) Inventors: Edward Harrison Teague, San Diego, CA (US); Fatih Ulupinar, San Diego, CA (US); Nileshkumar J. Parekh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 629 days.

(21) Appl. No.: 11/144,325

(22) Filed: Jun. 3, 2005

(65) Prior Publication Data

US 2006/0198344 A1 Sep. 7, 2006

Related U.S. Application Data

(60) Provisional application No. 60/658,991, filed on Mar. 4, 2005.

(51) Int. Cl.
*H04W 68/00* (2009.01)
(52) U.S. Cl. ............ 455/458; 455/442; 455/456.1; 455/446; 455/423
(58) Field of Classification Search .......... 455/458, 455/442, 456.1, 446, 423, 519
See application file for complete search history.

(56) References Cited

U.S. PATENT DOCUMENTS

| | | | | |
|---|---|---|---|---|
| 5,212,822 A | * | 5/1993 | Fukumine et al. | 455/435.3 |
| 5,406,614 A | * | 4/1995 | Hara | 455/435.3 |
| 5,642,398 A | * | 6/1997 | Tiedemann et al. | 455/426.1 |
| 5,732,350 A | * | 3/1998 | Marko et al. | 455/435.1 |
| 5,732,357 A | * | 3/1998 | Gayton et al. | 340/7.26 |
| 5,915,210 A | | 6/1999 | Cameron et al. | |
| 6,324,399 B1 | * | 11/2001 | Salmivalli | 455/433 |
| 6,411,816 B1 | * | 6/2002 | McDonald et al. | 455/518 |
| 6,434,396 B1 | | 8/2002 | Rune | |
| 6,675,022 B2 | * | 1/2004 | Burgan et al. | 455/524 |

(Continued)

FOREIGN PATENT DOCUMENTS

CN 1212585 3/1999

(Continued)

OTHER PUBLICATIONS

International Search Report and Written Opinion—PCT/US2006/008134, International Search Authority—European Patent Office—Jun. 26, 2006.

*Primary Examiner* — Kwasi Karikari
(74) *Attorney, Agent, or Firm* — Stanton Braden

(57) ABSTRACT

Systems and methods are described that mitigating coverage gaps near region boundaries using a plurality of multi-sector broadcast (MSBC) paging channels in wireless networking environments. One or more MSBC paging channels can be assigned unique time slots, such that although the channels can be identical, they are disjointed in time. Accordingly, such channels and/or dynamically generated paging zones associated therewith can be overlapped in areas where wireless device density is high and requires substantial paging capacity. Additionally, a single paging channel can be employed in multiple instances in a paging region without overlap to mitigate inter-channel interference.

54 Claims, 15 Drawing Sheets

U.S. PATENT DOCUMENTS

| | | | |
|---|---|---|---|
| 6,721,755 B1 * | 4/2004 | Lee | 707/102 |
| 7,043,259 B1 * | 5/2006 | Trott | 455/458 |
| 2002/0142788 A1 * | 10/2002 | Chawla et al. | 455/504 |
| 2003/0078042 A1 * | 4/2003 | Miriyala et al. | 455/435 |
| 2003/0148765 A1 * | 8/2003 | Ma et al. | 455/438 |
| 2003/0157966 A1 * | 8/2003 | Sato et al. | 455/561 |
| 2004/0203934 A1 * | 10/2004 | Kvarnstrom et al. | 455/458 |
| 2005/0054349 A1 * | 3/2005 | Balachandran et al. | 455/456.1 |
| 2005/0227731 A1 * | 10/2005 | Kall | 455/560 |
| 2006/0148493 A1 * | 7/2006 | Narasimha et al. | 455/458 |

FOREIGN PATENT DOCUMENTS

| | | |
|---|---|---|
| CN | 1247683 | 3/2000 |
| CN | 1553739 | 12/2004 |
| EP | 1418779 A2 | 5/2004 |
| EP | 1275266 B1 | 7/2004 |
| JP | 053581 | 1/1993 |
| JP | 9116953 | 5/1997 |
| JP | 2004194015 | 7/2004 |
| WO | WO 98/32242 | 7/1998 |

* cited by examiner

MULTIPLE PAGING CHANNELS FOR EFFICIENT REGION PAGING

CROSS REFERENCE

This application claims priority from Provisional Application No. 60/658,991, filed Mar. 4, 2005, entitled "Multiple Paging Channels for Efficient Region Paging" and is assigned to the assignee of the present application, which is incorporated by reference in its entirety.

BACKGROUND

I. Field

The following description relates generally to wireless communications, and more particularly to providing multiple multi-sector broadcast paging channels to provide region-wide paging of wireless devices with improve spectral efficiency.

II. Background

Orthogonal Frequency Division Modulation or Orthogonal Frequency Division Multiplexing (OFDM) is a protocol that is currently utilized in wireless environments to transmit and receive data. OFDM modulates digital information onto an analog carrier electromagnetic signal, and is utilized in an IEEE 802.11a/g WLAN standard. An OFDM base band signal (e.g., a subband) is a sum of a number of orthogonal sub-carriers, where each sub-carrier is independently modulated by its own data. Benefits of OFDM over other conventional wireless communication protocols include ease of filtering noise, ability to vary upstream and downstream speeds (which can be accomplished by way of allocating more or fewer carriers for each purpose), ability to mitigate effects of frequency-selective fading, etc.

Paging channels are employed in wireless networks to page a mobile device, such as a cellular phone, in order to instruct the mobile device to connect to the network for service. In conventional systems, the network has only a rough knowledge of a location of a mobile device, and no knowledge of channel quality in the area of the mobile device prior to page transmission. Consequently, a page message typically must be sent over a wide region (e.g., a plurality of sectors) at low spectral efficiency due to such inadequate information. Thus, typical paging systems employ a paging channel that is transmitted independently from each sector in a paging region, which can be established based on a registration history for the mobile device. A page can then be transmitted to the mobile device by sending the paging message from each sector in the region. While such paging message can be transmitted at approximately the same time, page transmissions are typically independent of each other.

Some conventional systems employ what is known as a forward link soft-handoff to improve performance. This technique permits multiple sectors to transmit a paging signal to a mobile device when the network has an estimate of the location of the device. However, even though sectors can transmit the same signal, such signals are subject to sector-specific scrambling, which in turn requires that the mobile device receive and decode the signals separately, and combine signal energy at the receiver after receipt and separate decoding. Such systems unnecessarily increase device complexity and signal translation overhead while reducing spectral efficiency.

In view of at least the above, there exists a need in the art for a system and/or methodology that facilitates improving paging signal spectral efficiency within a transmission sector, and in particular near sector boundaries.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Embodiments include a plurality of systems/methodologies for mitigating coverage gaps near region boundaries using a plurality of multi-sector broadcast (MSBC) paging channels in wireless networking environments (e.g., OFDM, OFDMA, . . . ). For example, a plurality of MSBC paging channels can be assigned unique time slots, such that although the channels can be identical, they are disjointed in time. Accordingly, such channels can be overlapped in areas where wireless device density is high and requires substantial paging capacity. Additionally, a single MSBC paging channel can be employed in multiple instances in a paging region so long as overlapping instances of the single paging channel are minimized to mitigate inter-channel interference.

In accordance with another embodiment, a method of providing multiple multi-sector broadcast (MSBC) paging channels to provide communication service over a wireless network can comprise providing multiple MSBC paging channels for transmission from a plurality of sectors in a paging region in the network to mitigate service coverage gaps between sectors, assessing a page list of devices to be paged in the paging region and a paging area for each device in the page list, assigning one or more MSBC paging channels to each sector based at least in part on a number of devices to be paged in each sector, and transmitting pages to a subset of devices to be paged in each sector over the one or more MSBC paging channels assigned to each sector. Paging data can be modulated using an OFDM modulation technique, and paging channels can be assigned unique transmission time slots to minimize interference between channels.

In another aspect, a method of generating dynamic paging zones within a region in a wireless communication environment can comprise receiving an input list of devices to be paged in the region, selecting one of a plurality of multi-sector broadcast (MSBC) paging channels for transmitting pages in the region, assigning the selected MSBC paging channel to an empty zone, and populating the zone with a subset of devices identified in the input list. Additionally, distance-based registration techniques can be employed to facilitate populating a zone with a subset of devices to be paged. Moreover, the method can further comprise transmitting pages over a single-sector paging channel to devices whose registration data indicates that they are located near a perimeter of the region in order to ensure paging signal availability in such peripheral areas.

In yet another aspect, a system that facilitates providing a plurality of dynamic multi-sector broadcast (MSBC) paging channel transmission zones in a wireless network region can comprise a server that receives input information related to incoming pages for devices in a wireless network region and a zone generation component that assigns an MSBC paging channel to at least one zone and populates the at least one zone with a subset of devices to be paged. The region server can further comprise a scheduler component that assigns time slots to individual paging channels. Zones associated with different paging channels can be overlapped to meet paging capacity requirements in specific geographical areas without an increase in channel interference.

In still another aspect, an apparatus that facilitates providing multiple paging channels for multi-sector broadcast (MSBC) paging channel transmission in a wireless network environment can comprise means for receiving a page list comprising information related to devices to be paged in a network region, means for parsing the page list into subsets of devices according to device density in one or more geographical areas of the region, means for generating paging zones with unique MSBC paging channels that are disjointed in time to mitigate interference, and means for transmitting pages to subsets of devices in respective paging zones. Additionally, the apparatus can comprise means for identifying devices that cannot be assigned to a particular zone and transmitting pages intended for such devices over a single sector paging channel.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
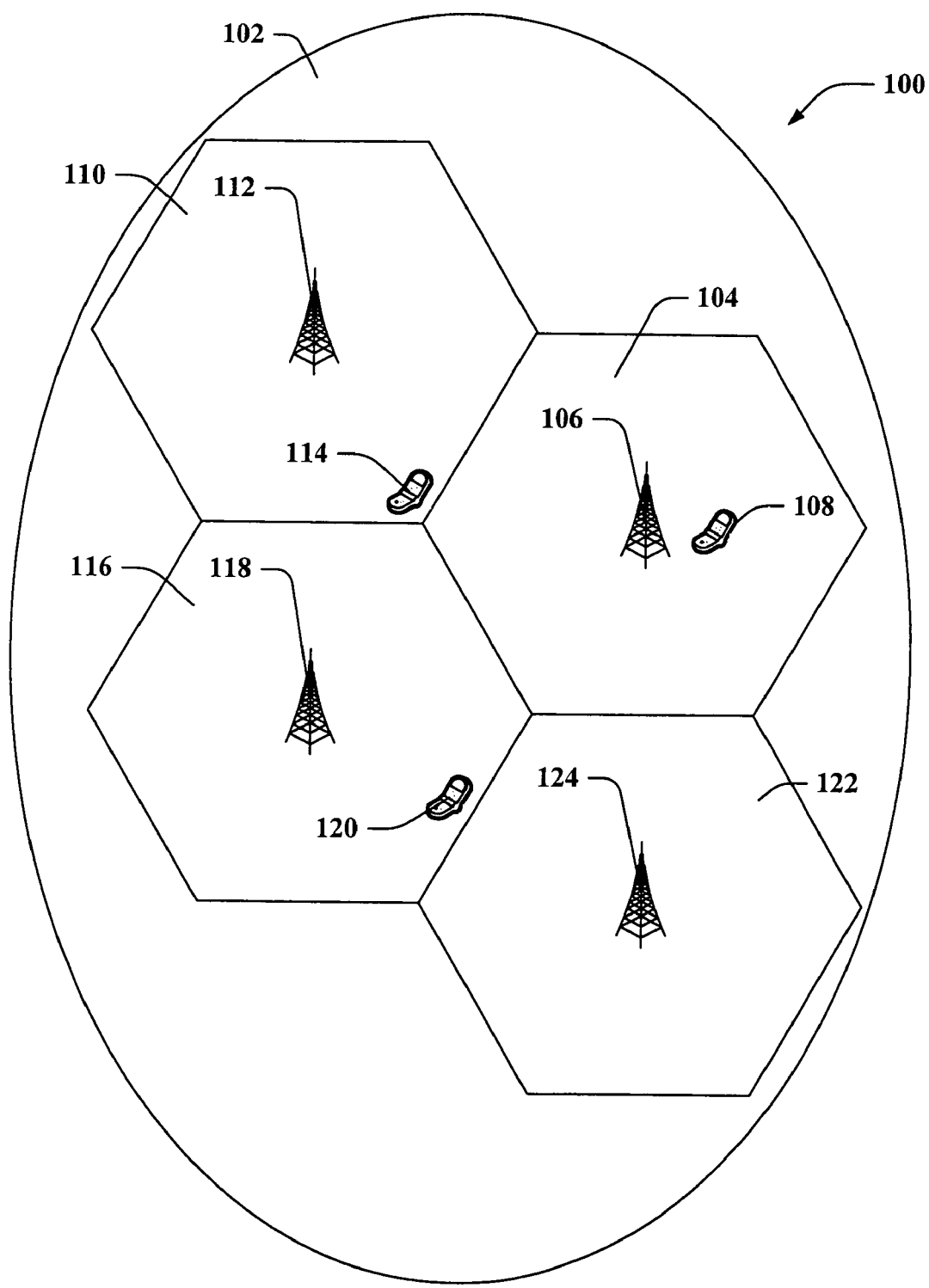
FIG. 1 illustrates a high-level system overview of a wireless communication network according to an embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In accordance with one or more embodiments and corresponding disclosure thereof, various aspects are described in connection with providing multiple channels in each sector of one or more wireless network regions for multi-sector broadcast channel (MSBC) paging transmissions. As used herein, MSBC refers to synchronize network transmissions of identical waveforms from multiple sectors in a network. Single-sector paging channel (SSPC), as used herein, refers to a traditional paging channel in a sector, which can be employed as a backup transmission technique to page users that may not be able to receive pages over MSBC-based paging channels.

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP)

phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Implementation of the MSBC technique(s) described herein can be subject to certain constraints related to, for example, MSBC boundary performance and page sets per region. For instance, MSBC can achieve improved spectral efficiency in part because the combination of energy from multiple sectors can improve a received signal-to-noise (SNR) ration of a paging message, particularly at sector edges. Since MSBC transmissions set spectral efficiency with this assumption, it is possible that some mobile devices, for instance, those located in sectors near an edge of a network region, may not be able to demodulate an MSBC waveform. In such scenarios, mobile devices near region edges may require page service by an SSPC. However, SSPC exhibits reduced spectral efficiency when compared to MSBC. Additionally, when SSPC is attempted after an MSBC page attempt, a re-paging mechanism can decrease mobile device battery life, since such sleeping mobiles must wake up twice per paging cycle. In order to retain the performance increase associated with utilization of the MSBC paging channel, attempts can be made to ensure that MSBC region boundaries are defined in areas where few mobile devices are in use. However, such can result in large MSBC regions that can encompass entire metropolitan areas.

A second constraint that can be associated with MSBC technique utilization is that identical waveforms are transmitted throughout an MSBC paging region, which can result in a page being sent over an entire region even though the location of a mobile device being paged within the region is known with a high degree of specificity. As will be described herein, various embodiments are presented that facilitate improving page signal reception at MSBC paging region boundaries while permitting region size to be kept small, as well as permitting dynamic changing of regions boundaries.

The systems and methods described herein can facilitate removing coverage gaps at or near region boundaries in a wireless network that employs MSBC paging channels, which mitigates reliance on SSPC paging at region boundaries. SSPC paging techniques are spectrally inefficient when compared to MSBC paging techniques, and such inefficiency can lead to reduced battery life in mobile devices near region boundaries. By employing MSBC paging channels, a wireless network can achieve improved flexibility with regard to region boundary placement (e.g., in populated areas, . . . ), which can permit smaller regions to be defined and increase dynamic region control by the network.

Referring now to the drawings, FIG. 1 illustrates a high-level system overview of a wireless communication network in connection with an embodiment. The embodiment relates to a novel system 100 that facilitates improving spectral efficiency at or near sector boundaries in a wireless network service region using an MSBC paging channel. While FIG. 1 relates to improved paging signal strength at sector boundaries within a region, such improvements can be carried through to include improved signal strength at region boundaries as well, as is detail infra with regard to subsequent figures. A region 102 can be any service area and can comprise any number of sub-regions, or sectors, each of which can further comprise at least one base station (e.g., tower, transmitter, . . . ) from which a communication signal can be transmitted to provide service to the sector. For example, a sector 104 can comprise a base station 106 that can transmit a signal to a mobile device 108 in the sector 104.

Mobile devices, such as cellular telephones, typically register with the network periodically and/or in response to certain registration-triggering events to inform the network of the location of the mobile devices. For instance, distance-based registration methods predefine a distance or radius for a mobile device, such that if the mobile device moves more than the predefined distance from geographic coordinates of a last registration, then the mobile device re-registers with the network to alert the network to its position. Alternatively, area-based registration can be employed to trigger device registration. For instance, movement of mobile device 108 across a sector boundary (e.g., from sector 104 to sector 110) can trigger mobile device 108 to transmit a signal to the network indicating that device 108 is currently in the new sector, and that therefore the network should attempt to page device 108 in the new sector.

The subject embodiment facilitates transmitting a page to a mobile device 108 without requiring that the sector within the region in which the mobile device 108 is located be known specifically. Rather, if the mobile device 108 is known to be in service region 102, then a single, identical paging message can be transmitted from all base stations 106, 112, 118, 124 to present a paging signal to all points in the region 102. For example, a single waveform can be generated and transmitted from the base stations 106, 112, 118, 124 in each of the sectors 104, 110, 116, 122.

Mobile device 108 in sector 104 can receive a signal that is transmitted predominantly, if not entirely, from the base station 106 in sector 104, for illustration. Mobile device 120 in sector 116 is located near the border of sector 122, and therefore can receive a signal that is an aggregate of the signal broadcast from station 118 in sector 116 as well as the station 124 in sector 122. Such signal aggregation can occur within the air interface and need not require special functionality at a receiver because the waveform transmitted from base stations 118 and 124 in sectors 116 and 122 are identical. Similarly, mobile device 114 in sector 110 can receive signals from base stations 106, 112, and 118 in sectors 104, 110, and 116, respectively, rather than from sector 110 only. In this manner, the described embodiment facilitates high spectral efficiency near sector borders, where conventional systems that provide differing waveforms from each base station fail.

According to related aspects, the waveform transmitted from the base stations can be modulated according to, for example, an OFDM protocol or the like. Additionally, cyclic prefixes can be appended to the paging signals to adjust for time delay that can arise due to variances in the respective distances of base stations from a given mobile device. In this manner, signals from different sectors and/or base stations therein can be manipulated to facilitate ensuring their arrival at the mobile device within a predefined guard time (e.g., a time period within which interference is minimal and signal energy can be aggregated). Thus, a receiving device need not be aware of the signal source(s), but rather con be concerned with demodulating the aggregate of the transmitted identical paging signals. Furthermore, system 100 can be employed in connection with any number of suitable devices with wireless communications capabilities. For example, system 100 can be employed within a mobile phone, a personal digital assistant, a laptop computer, a desktop computer, or the like.

Figure 2:
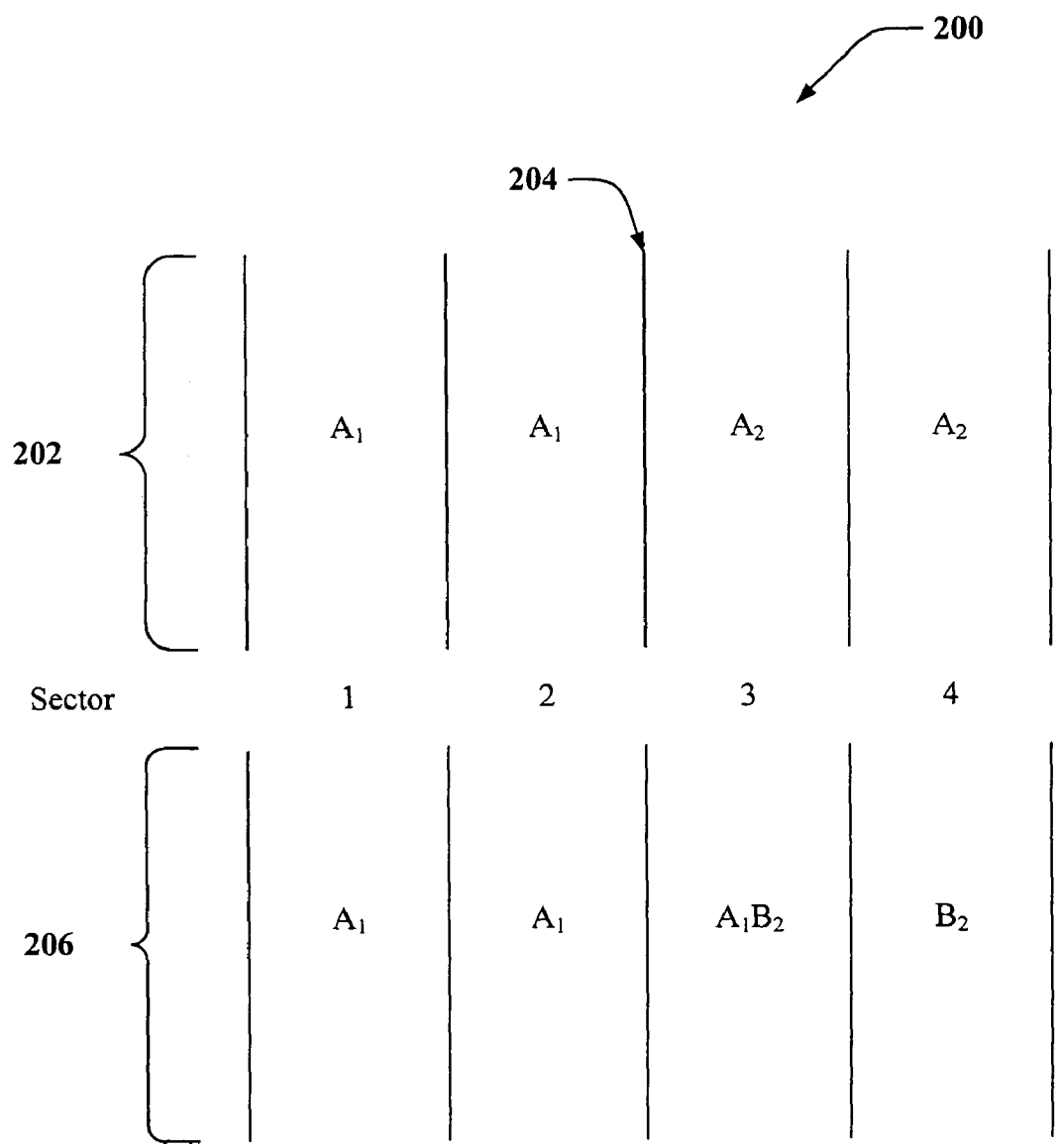
FIG. 2 illustrates a linearized representation of a wireless network with a coverage gap that can arise when employing a single MSBC channel per wireless service region and which can be mitigated by employing and/or enabling multiple MSBC paging channels in the region according to an embodiment.

FIG. 2 illustrates a linearized representation of a wireless network 200 with a coverage gap that can arise when employing a single MSBC channel per wireless service region and which can be mitigated by employing and/or enabling multiple MSBC paging channels in the region. The figure depicts two paging channels "A" and "B," over which two different paging packets (e.g., "1" and "2") or waveforms can be transmitted. Thus, according to the figure, "$X_i$" denotes paging packet i transmitted over paging channel X. It will be appreciated that the embodiments described herein are not limited to two paging channels and/or two paging packets, but rather can comprise any suitable number of channels and/or packets, as will be understood by one skilled in the art.

According to a single MSBC paging channel scenario 202, single channel A is employed to transmit paging packets in two regions. For instance, sectors 1 and 2 can be in a first region, and sectors 3 and 4 can be in a second region. However, a coverage gap 204 can arise near the region border between sectors 2 and 3. Employing multiple channels and permitting channel overlap in sectors near region borders can mitigate such coverage gaps.

For instance, a multiple channel scenario 206 can be implemented whereby MSBC transmissions can overlap in sector 3, which mitigates a coverage gap between paging packets 1 and 2. Channels A and B can be designed in a manner such that, when not in use, they do not contribute to sector overhead. Accordingly, additional overhead costs associated with multiple MSBC paging channels can be limited to sector in which multiple MSBC channels are actually used concurrently. As such, sectors not bordering a region boundary need not experience increased overhead. Additionally, orthogonal frequency division multiplexing (OFDM) techniques can be employed to modulate paging channels and to permit time slots to be associated with each paging channel. Each channel can have one or more unique time slots, during which a paging packet can be transmitted over the channel. If a paging channel is not in use during its allotted time slot, the channel can be used for standard data and/or control transmissions in the sector, thereby further mitigating any increase in transmission overhead.

Figure 3:
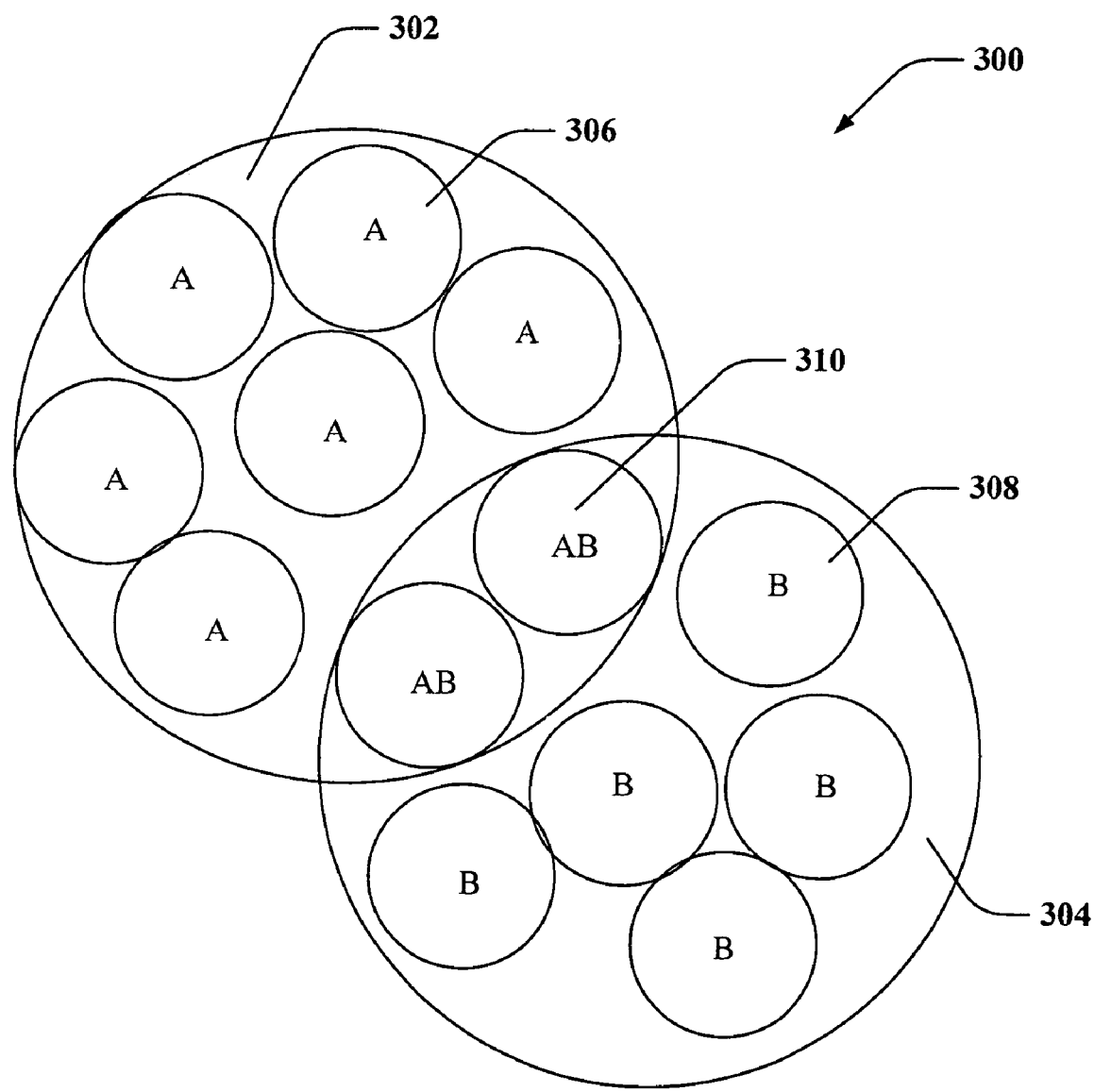
FIG. 3 is an illustration of a wireless network comprising two adjacent service regions according to an embodiment.

FIG. 3 is an illustration of a wireless network 300 comprising two service regions 302 and 304. Service region 302 comprises a plurality of sectors 306 that transmit identical page waveforms over an MSBC paging channel (e.g., Channel A). Service region 304 comprises a plurality of sectors 308 that can transmit identical paging waveforms over another MSBC paging channel (e.g., Channel B). It is to be appreciated that channels A and B can be identical channels with regard to frequency, if desired, and in such a case can be assigned unique time slots so that they do not transmit simultaneously, but rather sequentially. Thus, channels for different regions can be disjointed in time so that regions employ different channels at region boundaries. Sectors near region boundaries 310 can transmit any permutation of paging waveforms, and such permutations can change each time the channel is utilized (e.g., during transmission in each time slot). Thus, sectors 310 can transmit pages over channel A as well as channel B to facilitate paging mobile devices at or near the boundaries of either first region 302 or second region 304. In sectors 310 that broadcast over both channels, transmission can be subject to time division to mitigate interference between channels.

Figure 4:
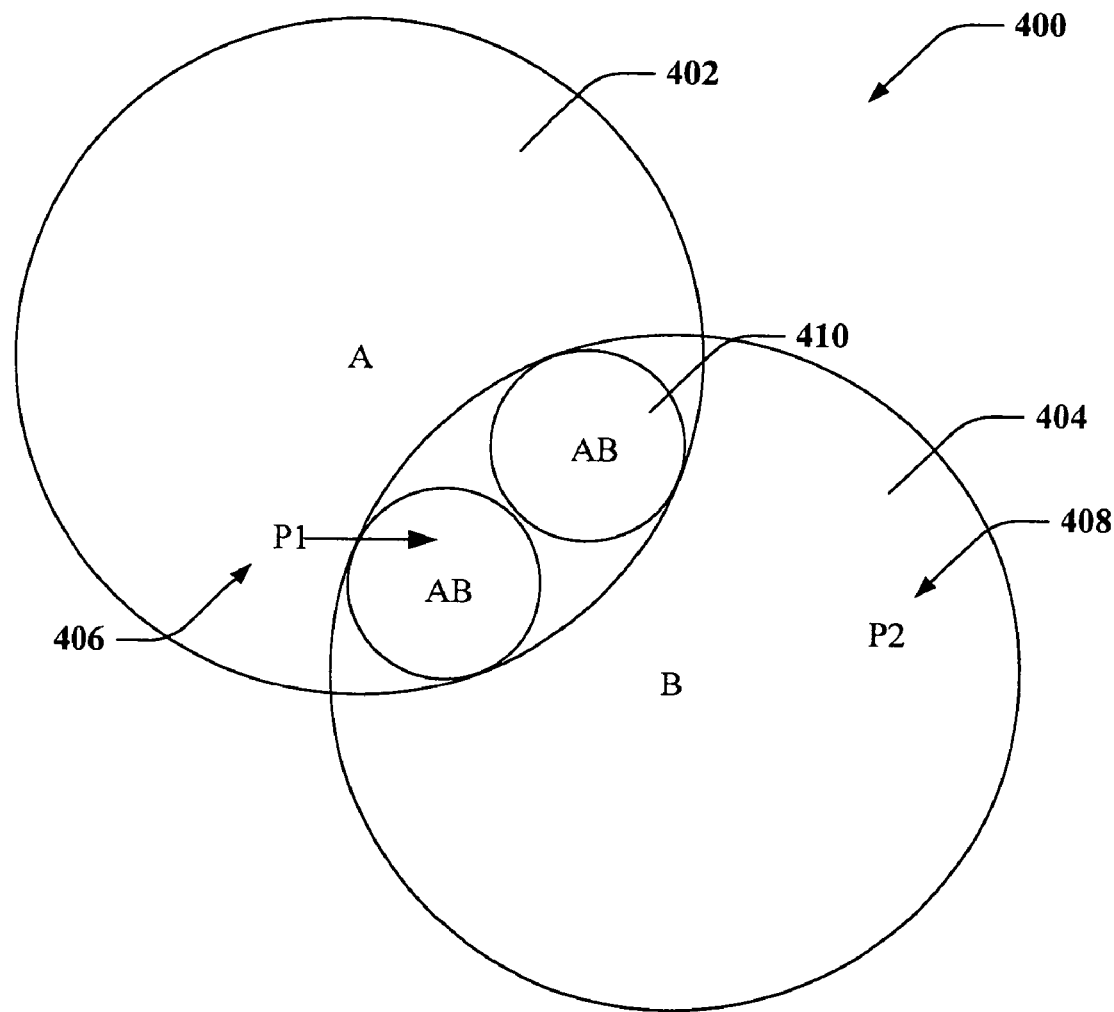
FIG. 4 is an illustration of a network that employs a plurality of MSBC paging channels according to an embodiment.

FIG. 4 is an illustration of a network 400 similar to that described above with regard to FIG. 3. As illustrated, network 400 comprises a first region 402 that can be associated with a first MSBC paging channel A. A second region 404 can be associated with a second paging channel B. According to a simplified example, it can be assumed that each paging channel can carry a single page. Regions 402 and 404 can be defined to delineate zones in which pages P1 and P2 are to be transmitted, respectively. Regions 402 and 404 can overlap, and sectors 406 near region borders can transmit both page channels A and B to ensure that no matter where the mobile devices are in their respective regions, they can receive an intended page. For instance, a mobile device receiving a first page 408 is illustrated in the first region 402, while a mobile device receiving a second page 410 is illustrated in the second region 404. According to this example, knowledge of the users' locations facilitates defining paging regions for delivery of the pages 408 and 410. However, if the knowledge of the location of the first user overlaps with the location of the second user, and the paging channel can only hold one page, then all sectors in first region 402 can be defined to transmit over channel A while all sectors in second region 404 can be defined to transmit over channel B. Sectors that fall into both regions, such as sectors 406, can thus be defined to transmit over channels A and B, where each channel transmits its respective page. It is to be appreciated that if the users are sufficiently distant from one another, then definition of regions surrounding such users will result in non-overlapping regions, in which case the same channel can be used in the first region to transmit a first page as well as in the second region to transmit a second page.

Additionally, a first user receiving first page 408 over Channel A is illustrated as traveling into an area of region overlap, as indicated by the rightward-pointing arrow in FIG. 4. When the mobile device is in the overlap area (e.g., a border, or overlapping, sector 406), it is technically in both regions 402 and 404. However, since sectors 406 in the overlap area still support transmission of a page over channel A, the mobile device receiving the first page 408 need not re-register with the network (e.g., as being in the second region 404, which mitigates a "ping-pong" effect that can occur at region boundaries with regard to conventional systems. Rather, re-registration can be delayed until the mobile device enters a sector in which its last registered region is not supported.

Figure 5:
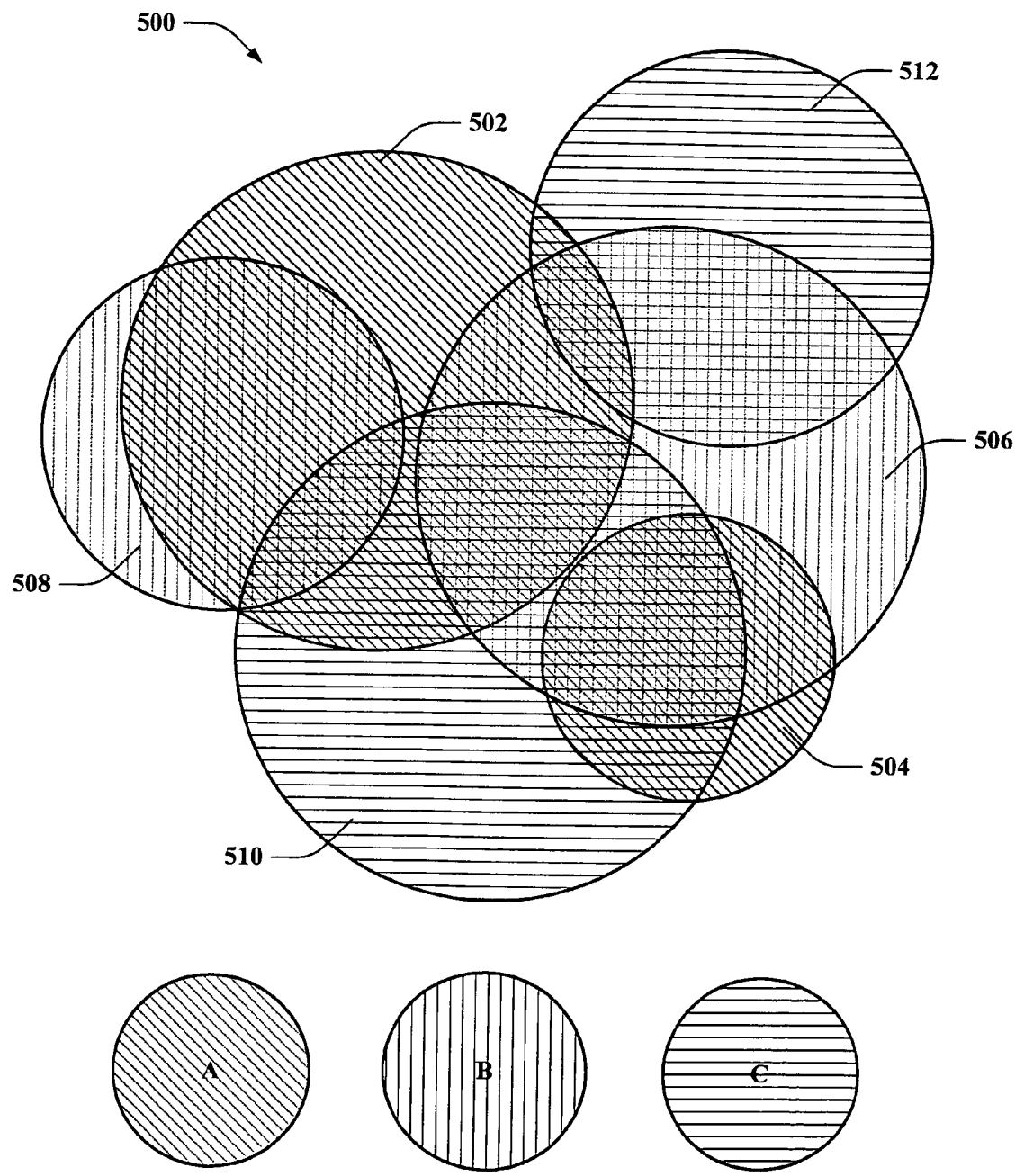
FIG. 5 illustrates a plurality of MSBC channels that can be employed to facilitate generation and/or maintenance of dynamic MSBC zones according to an embodiment.

FIG. 5 illustrates a plurality of MSBC channels that can be employed to facilitate generation and/or maintenance of dynamic MSBC zones. According to the figure, three different MSBC paging channels are defined (A, B, and C) and are depicted with hash lines in slanted, vertical, and horizontal orientations, respectively. Channel A is employed in a first zone 502 and a second zone 504. Third and fourth zones 506 and 508 can transmit page signal(s) over MSBC channel B, and fifth and sixth zones 510 and 512 can employ MSBC paging channel C to deliver pages to users located therein. It will be understood that FIG. 5 is not intended to limit the number of zones that can be generated, the number of channels that can be employed per region, or the number of zones that can employ a particular channel. Rather, FIG. 5 is intended to illustrate that zones can be generated in various sizes (as well as shapes) depending on, for example, page density in a given area. For example, if an MSBC channel can transmit 1000 pages per transmission, without being limited thereto, and 2500 incoming pages are detected for a region or a portion thereof, then three zones can be generated and overlapped using three different MSBC channels to facilitate effectively transmitting all incoming pages to users in the area.

To further this example, a metropolitan area can exist in the shaded area where zones 502, 506, and 510 overlap. Mobile device density can be increased in such an area during a workday, and can consequently require in increase in a number of zones and/or MSBC channels to facilitate meeting paging demands during such times. During weekends and nights, when the metropolitan area is less densely populated, a single zone can be effective to meet paging demands. The systems and methods described herein can facilitate such dynamic zone generation, wherein zones can employ identical MSBC paging channels when the do not overlap, can employ unique MSBC paging channels when zones do overlap, and can be of arbitrary size and shape depending on channel capacity and page volume in a given area. Overlap can be determined when zones have one or more sectors (e.g., base stations) in common. Additionally, an MSBC region server (not shown), which is described in greater detail infra with regard to subsequent figures, can be employed to receive all page requests for its region and to generate and/or regenerate appropriate zones during each paging cycle as a function of page request volume and channel transmission capacity. The MSBC region server can serve an arbitrarily large area as permitted by processing speed can communication delay constraints.

Additionally, each sector in a dynamic zone can generate and transmit an overhead message that can inform a receiving device of an identity of the MSBC paging channel over which the sector base station is broadcasting. The receiving device can read the overhead message and identify which specific channel(s) are should be demodulated. According to the three-channel example presented above, there are eight possible permutations of channel combinations that can be presented to a receiving device in the overhead message (e.g., eight possible combinations of channels that can be transmitted in a sector): A, B, C, AB, AC, BC, ABC, and 0 (e.g., the null set indicating no channels are in use, . . . ). Because paging zones are generated dynamically and can be persisted for as little as one transmission cycle, at any given time a sector can have one of the eight states assigned to it and such state can change for a subsequent transmission cycle.

Figure 6:
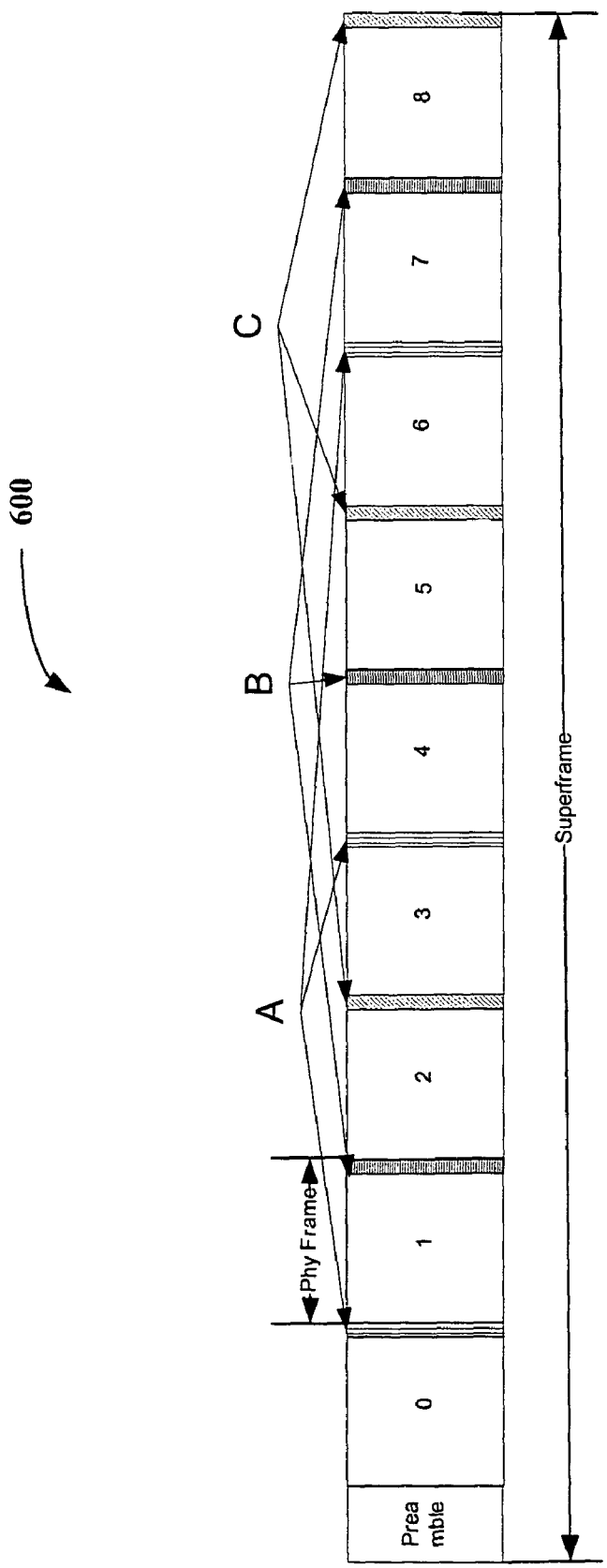
FIG. 6 is an illustration of a signal superframe that comprises three independent MSBC paging channels according to an embodiment.

FIG. 6 is an illustration of a signal superframe 600 that comprises three independent MSBC paging channels, labeled A, B, and C. Superframe 600 comprises a preamble and nine Phy frames, labeled 0-8, each of which comprises a plurality of symbols, or modulated data packets. The last symbol of each Phy frame can be associated with a particular MSBC paging channel. For instance, the last symbols of frames 0, 3, and 6 can comprise an OFDM symbol that identifies and/or describes channel A. Similarly, channel B can comprise three OFDM symbols appended to each of frames 1, 4, and 7, respectively, and channel C can comprise an OFDM symbol appended to each of frames 2, 5, and 8, respectively. Thus, each MSBC paging channel can comprise three OFDM symbols, which can be the last symbol of three different Phy frames, in the case of a three-channel scenario. It will be apparent to one skilled in the art that superframes of differing sizes can be employed to describe different numbers of MSBC paging channels, etc.

A standard packet broadcast control channel can be employed to indicate which of the MSBC paging channels are being used during a given page cycle. If one or more of the MSBC paging channels is not in use for a superframe transmission during a given page cycle, such as can occur when page volume is low and/or can be handled by a single MSBC paging channel of a predefined transmission capacity, then the OFDM symbols appended to the corresponding Phy frames can be used by the Phy frames as in normal operation. Superframe 600 can be utilized by a scheduler, or MSBC region server, to schedule packet formats according to whether a last symbol of a frame is occupied by an OFDM symbol defining an MSBC channel, which can facilitate generation of overlapping and independent MSBC zones. Additionally, boundaries of such zones can be dynamically defined and/or redefined based at least in part on page volume during a given superframe. Moreover, according to a related aspect, any overflow paging load can be carried by an SSPC from sectors in the region.

Figure 7:
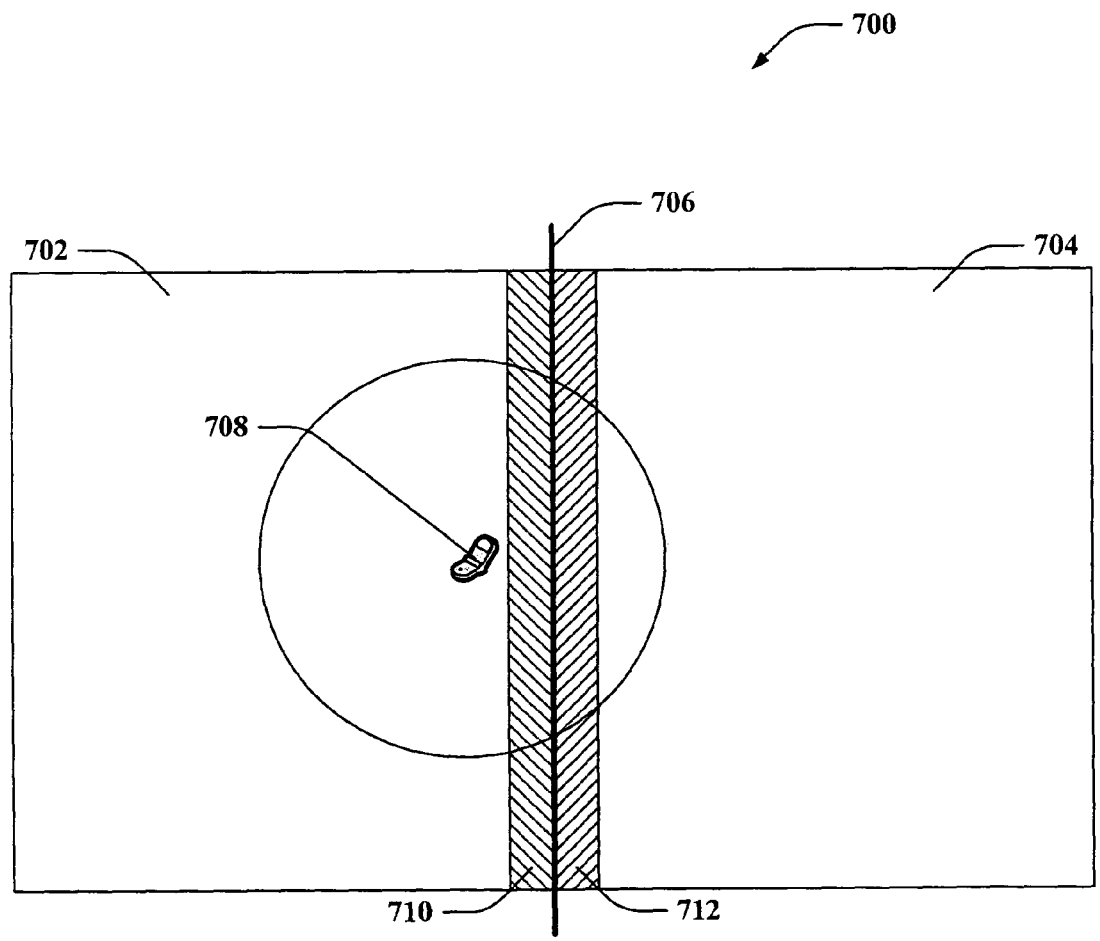
FIG. 7 is an illustration of a portion of a wireless network service area comprising zones in different service regions that can be governed by respective MSBC region servers according to an embodiment.

FIG. 7 is an illustration of a portion of a wireless network service area 700 comprising zones in different service regions that can be governed by respective MSBC region servers. A zone 702 in a first MSBC server region and a zone 704 in a second MSBC server region are separated by an MSBC server region boundary 706. An access terminal 708 (e.g., a mobile phone, a laptop, a PC, a PDA, . . . ) is located near a border area of zone 702 and has a paging area that extends into zone 704 in the second MSBC server region. Access terminal 708 can be paged in zone 702 over an MSBC paging channel. Sectors in a border area 710 of the first MSBC server region can transmit pages intended for access terminal 708 over both an MSBC paging channel and an SSPC in order to ensure that pages are received in such areas. Additionally, because the paging area of access terminal 708 extends into zone 704 of the second MSBC server region, access terminal 708 can be paged from zone 704 over an MSBC paging channel. Furthermore, sectors in a border area 712 of zone 704 can transmit a page to access terminal 708 over each of an MSBC paging channel and an SSPC.

It will be appreciated that a region served by an MSBC region server (not shown) can be arbitrarily large, subject only to processing power and/or communication speed considerations. As such, region boundaries, such as boundary 706, can be located in sparsely populated areas in order to reduce overhead in border sectors, which can transmit pages over both MSBC paging channels as well as SSPCs.

Figure 8:
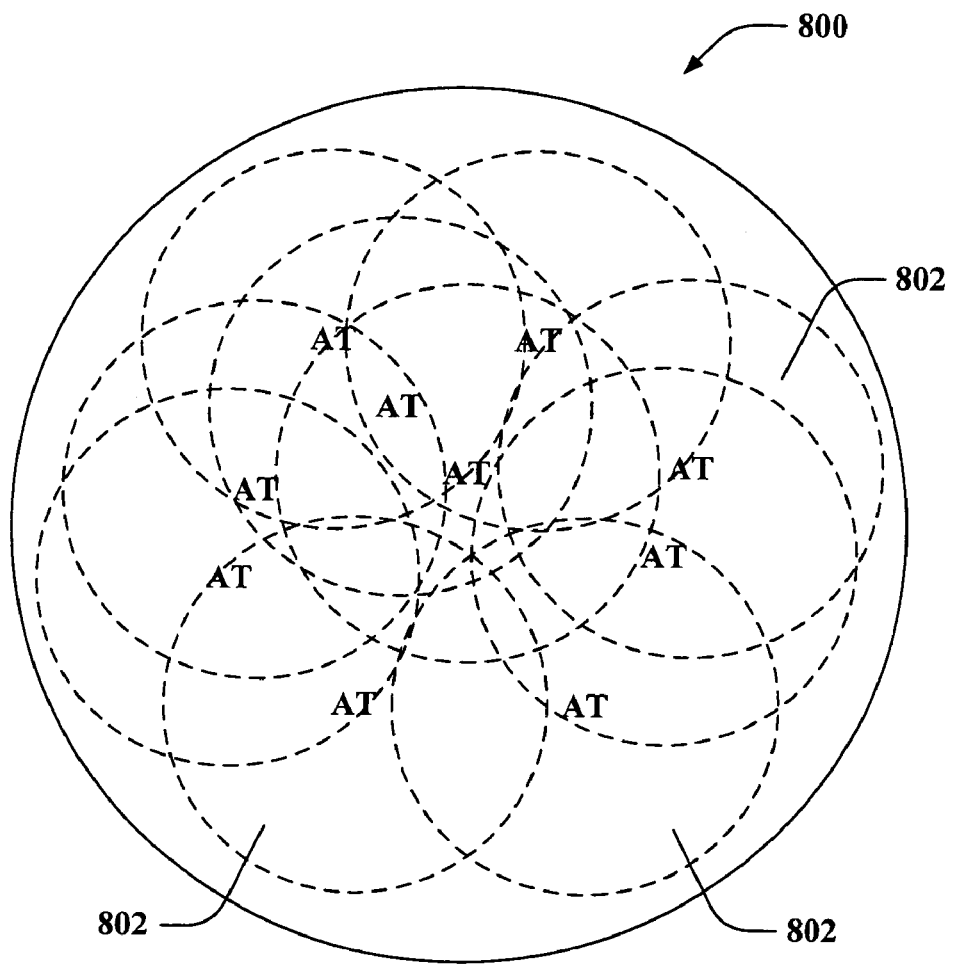
FIG. 8 is an illustration of a MSBC paging zone according to an embodiment.
Figure 8:
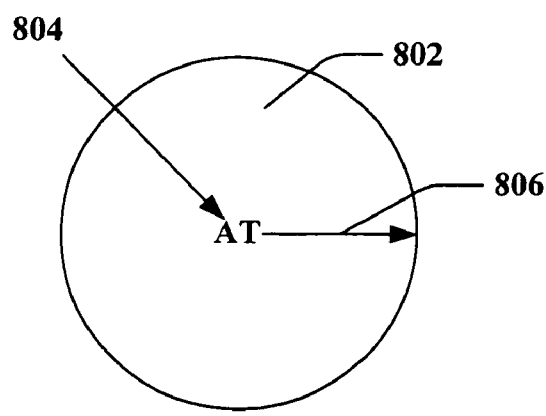

FIG. 8 is an illustration of a MSBC paging zone 800, such as described with regard to the preceding figures. Zone 800 can be defined in a manner that ensures that it is large enough to contain all paging areas 802 for access terminals being paged within zone 800 over an MSBC paging channel. Zone 800 size can be a function of MSBC paging channel carrying capacity (e.g., a number of pages that can be transmitted over an MSBC paging channel during a given paging cycle), and can be arbitrary in shape. For example, if an MSBC paging channel can carry 2000 pages per cycle, then zone 802 can comprise a minimum of 2000 access terminal paging regions 802 (and associated access terminals), and such minimum can be a maximum when every access terminal in zone 802 is being paged concurrently. In the event that only 1000 pages are received for transmission, for instance by an MSBC region server (not shown) that governs zone generation for a region, the zone can be expanded to encompass other access terminals and their paging regions 802 until a channel paging capacity threshold (e.g., 2000 pages, 3000 pages, 10,000 pages, . . . ) is approached and/or reached. In this manner, zones can be dynamically generated to have arbitrary size depending channel capacity and density of access terminals being paged in a particular portion of a region.

A paging area 802 can be defined as a prescribed circumference that surrounds a last known registration point 804 for a particular access terminal. The prescribed circumference can have a predefined radius that delineates a registration distance 806, such as is employed to facilitate a distance-based registration algorithm commonly used to trigger mobile device registration. For example, if registration distance 806 is defined as one mile, and a last known registration point 804 is positioned at a center of the paging area for the access terminal, then the access terminal can migrate anywhere within its paging area 802 without reregistering with a network providing service thereto. However, when an access terminal breaches its paging area 802 perimeter (e.g., realizes a displacement of greater than its predefined radius from its last registration point 804) then it can be triggered to reregister with the network. It will be appreciated that the preceding example is illustrative in nature, and is not intended to limit the size of the registration distance employed to illicit reregistration from an access terminal. By utilizing a distance-based registration technique, registration load can be randomly distributed, which in turn mitigates potential for registration hot spots. Additionally, "ping-pong" registrations, which can occur when an access terminal is at or near a sector or zone border can be mitigated because there are preset geographic registration boundaries.

Figure 9:
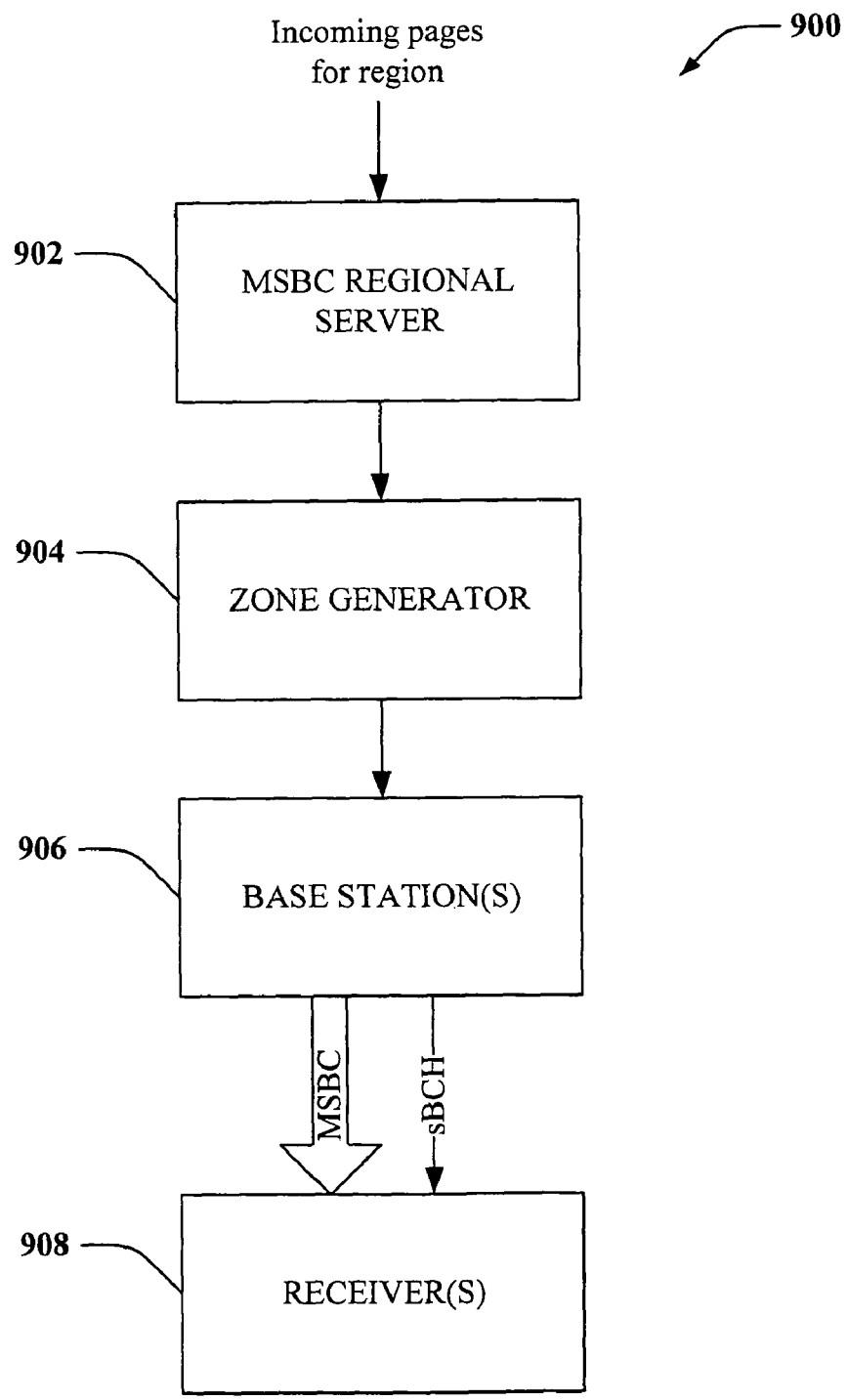
FIG. 9 is an illustration of a system that facilitates employing multiple MSBC paging channels across one or more wireless network regions according to an embodiment.

FIG. 9 is an illustration of a system 900 that facilitates employing multiple MSBC paging channels across one or more wireless network regions. They system 900 comprises an MSBC region server 902 that receives and/or identifies all pages to be transmitted in the region during a paging cycle. For example, MSBC region server 902 can receive and/or generate a page list base on incoming pages for devices located/registered within the region. Based on incoming page density and known paging channel capacity, a zone generator 904 can dynamically generate one or more paging zones within the region. It will be appreciated that although MSBC region server 902 and zone generator 904 are depicted as separate components operatively coupled to each other, MSBC region server 902 can comprise zone generator 904 as an integral component. Additionally, zone generator 904 is operatively coupled to one or more base stations 906 in respective sectors that comprise a region served by MSBC region server 902. Base stations 906 transmit pages to receivers 908 over an MSBC paging channel, and selectively over an SSPC paging channel. For instance, base stations located in perimeter sectors of the region can utilize the SSPC paging channel to ensure that any page overload in such areas can be handled by the SSPC channel to ensure page receipt at receivers 908 in such areas.

According to an example, MSBC region server 902 can determine that 1000 pages are incoming to the 16-sector region for a next paging cycle, and that 500 of the pages are to be transmitted to mobile devices, or receivers 908, within an area of the region comprising 4 contiguous sectors of the 16 sectors in the region. If paging channel capacity is known to be approximately 600 pages per channel per paging cycle, then zone generator 904 can generate one zone that covers the entire region and a second zone that comprises the 4 contiguous high-volume sectors. Base stations 906 in the first zone (all sectors in the region) generated by zone generator 904 can generate a first MSBC paging channel (e.g., channel A) that can be transmitted from all 16 sectors by all 16 base stations 906. Base stations 906 in the second zone (4 contiguous sectors) can additionally generate a second MSBC paging channel (e.g., channel B) by which the 500 pages for the second zone can be transmitted. According to this example, base stations 906 in the second zone need not generate and/or transmit channel A in order to effectively provide service to receivers 908 already in the second zone, but can be permitted to do so in order to ensure that any receivers 908 moving into or near the second zone during a page cycle can still receive pages intended for such receivers 908.

Figure 10:
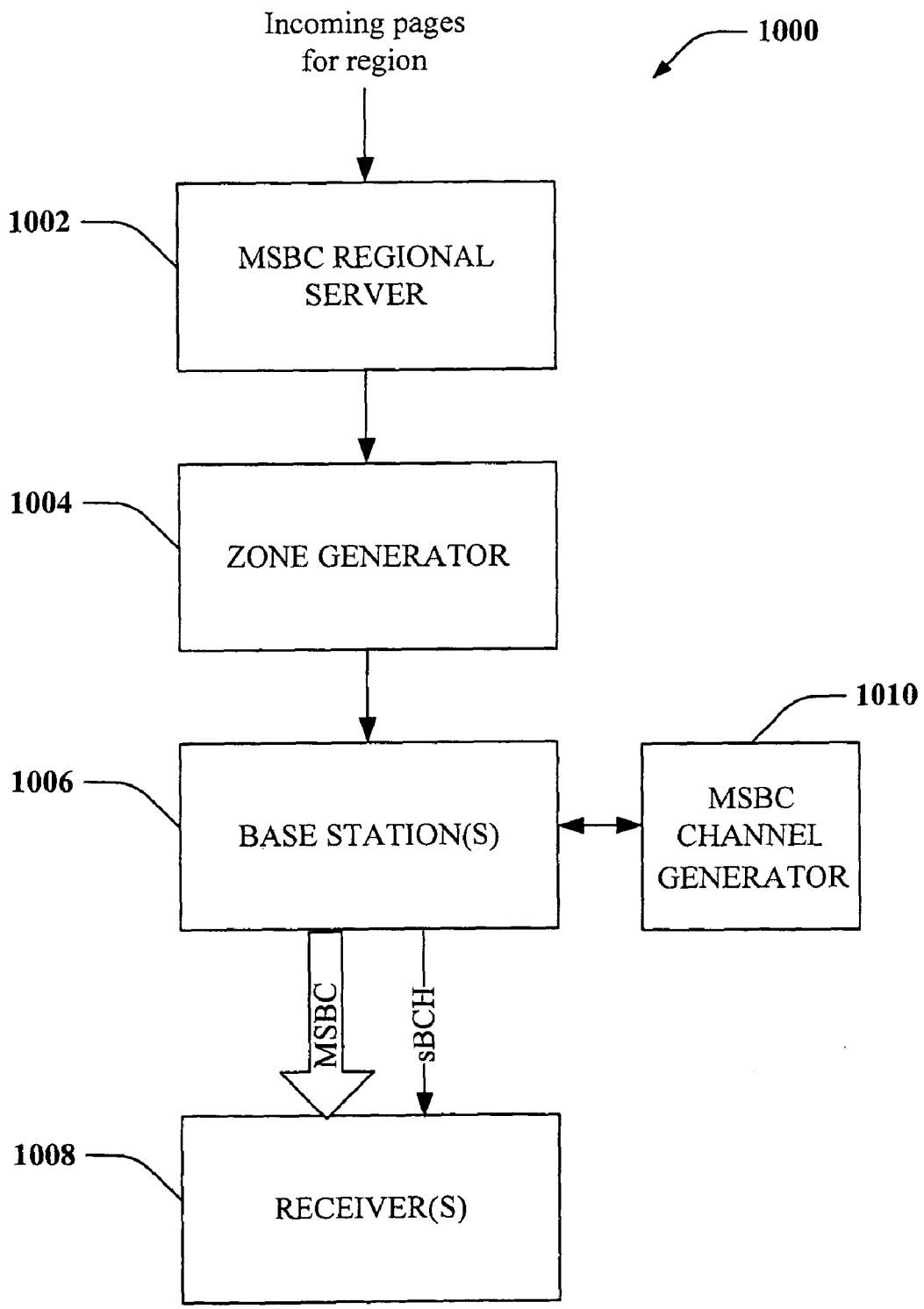
FIG. 10 is an illustration of a system that facilitates dynamically generating one or more paging zones in a wireless network service region and generating one or more MSBC paging channels for page transmission in the one ore more zones according to an embodiment.

FIG. 10 is an illustration of a system 1000 that facilitates dynamically generating one or more paging zones in a wireless network service region and generating one or more MSBC paging channels for page transmission in the one ore more zones. An MSBC region server 1002 is operatively coupled to and/or can comprise a zone generator 1004. MSBC region server 1002 can receive an access terminal page list as well as registration distances for the access terminals in the region and can map pages to intended areas within the region to identify high-density page areas. Zone generator 1004 can receive page density information from MSBC region server 1002 and can assign MSBC paging channels to base stations 1006 in sectors throughout the region. MSBC paging channel assignment can be a function of page density in one or more sectors as well as MSBC paging channel capacity, which in turn can be a function of processor power and communication speed. Zone generator 1004 can employ a dynamic zoning algorithm to generate one ore more paging zones within the region to provide sufficient paging capacity to handle transmission of all pages in the page list. Receivers 1008 can receive pages from the base stations 1006 over one or more of the designated MSBC paging channels. Additionally, base stations at or near region borders can transmit pages over an SSPC paging channel in order to ensure page delivery to receivers 1008 positioned in such areas. The following example illustrates a simplified dynamic zoning algorithm:

```
Input:
    -List of <AT> where each AT is represented by a
        <point, radius> pair, where,
        point represents the location of the last
            registration sector of the an AT, and
        the radius is the registration distance
            for the AT.
Output:
    -A List of <dyn-zone>, where dyn-zone is a
        List of <channel, List of <AT> > pairs
            where
            -Channel is A, B, C or SSPC
            -List of <AT> is a subset of the input
                list.
```

According to the above dynamic zoning algorithm, MSBC region server 1002 can receive as input a list of access terminals to be paged in the region. Each access terminal can be represented by a point-radius pair, such as can be employed in conjunction with a distance-based registration scheme, wherein "point" information comprises the last known registration coordinates and/or sector of a corresponding access terminal, and "radius" information describes a registration distance for the access terminal (e.g., a maximum permissible displacement from the point without requiring reregistration). Based at least in part on this input information, zone generator 1004 can generate a list of dynamic zones, wherein a dynamic zone has associated with it a list of channel-access terminal pair information. The paired data in the channel-access terminal list can comprise, for example, a unique subset of the input access terminal list where in each access terminal in the subset is identified and associated with one or more channels by which the access terminal can be paged. For instance, according to a 3-MSBC paging channel example, each access terminal can be associated with one or more of channels A, B, and C for MSBC paging and/or with an SSPC paging channel (e.g., in the event that the access terminal is located near a region border). It will be appreciated that more than one dynamic zone can utilize the same MSBC paging channel so long as such zones do not overlap.

Additionally, an MSBC channel generator 1010 is operatively coupled to one or more base stations 1006, and can generate one or more MSBC paging channels using, for example, OFDM, OFDMA, or any other suitable waveform generation technique. In order to facilitate allocating resources and/or pairing access terminals to paging channels, the following algorithmic example is proffered:

```
Set current-channel to A
Set curr-dyn-zone to <current-channel, empty-AT-
    list>.
Loop while AT is left in the input
    -If curr-dyn-zone capacity is full
    Put curr-dyn-zone to output list
    Set curr-dyn-zone to <current-channel, empty-AT-
        list>.
        -Select an AT from the input list whose point is
            closest to the center of mass of the points
            in the curr-dyn-zone and whose paging
            region does not overlap with previously
            created dyn-zones of the same channel.
        -If there is such an AT
            Move the selected AT from the input to the
                curr-dyn-zone.
        -Else if current-channel != C
            Set current-channel to next channel
            Put curr-dyn-zone to output list
            Set curr-dyn-zone to <current-channel,
                empty-AT-list>.
        -Else
            Exit loop
End loop
Perform SSPC paging for the remaining ATs
```

Figure 11:
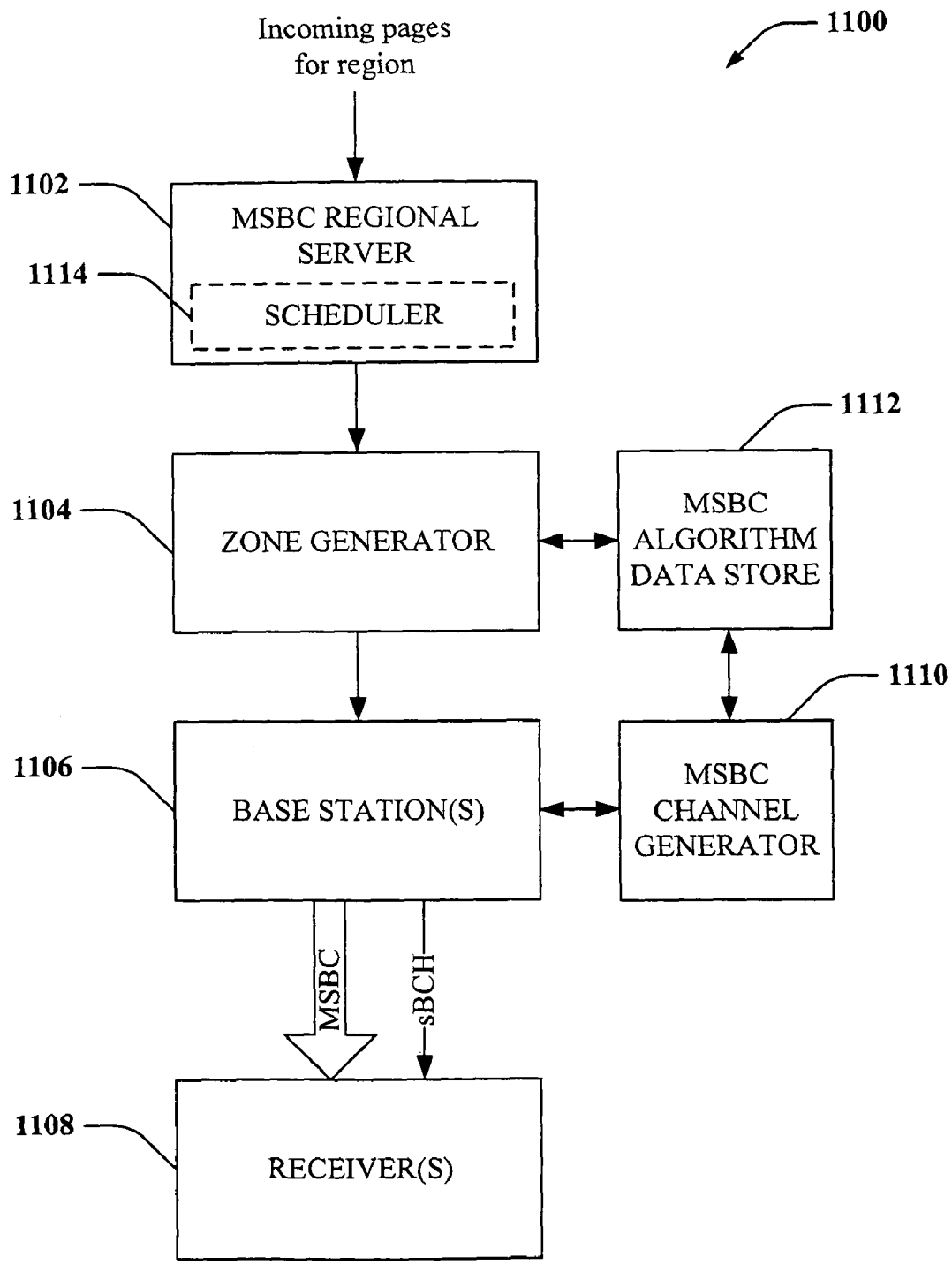
FIG. 11 is an illustration of a system that facilitates providing multiple MSBC paging channels to transmit pages throughout a region using dynamically generated paging zones according to an embodiment.

FIG. 11 is an illustration of a system 1100 that facilitates providing multiple MSBC paging channels to transmit pages throughout a region using dynamically generated paging zones. System 1100 comprises an MSBC region server 1102 that periodically and repeatedly receives a complete list of incoming pages for an entire paging region in a wireless service network. The page list can comprise registration distance information for all registered wireless devices (e.g., receivers) in the region. MSBC region server 1102 is operatively coupled to and/or can comprise a dynamic zone generator 1104, which can receive page density information from MSBC region server 1102 and can assign MSBC paging channels to base stations 1106 in sectors throughout the region. Each base station 1106 can transmit a sector overhead message that identifies which MSBC paging channel(s) are being broadcast over its sector during a given transmission cycle, as detailed with regard to FIG. 5. MSBC paging channel assignment can be a function of page density in one or more sectors as well as MSBC paging channel capacity, which in turn can be a function of processor power and communication speed. Zone generator 1104 can employ a dynamic zoning algorithm, such as described with regard to FIG. 10, to generate one ore more paging zones within the region to provide sufficient paging capacity to handle transmission of all pages in the page list. Receivers 1108 can receive pages from the base stations 1106 over one or more of the designated MSBC paging channels.

System 1100 further comprises an MSBC paging channel generator 1110 that generates paging channels whereby a plurality of identical paging waveforms can be broadcast from multiple sectors and permitted to aggregate over the air near sector borders to provide a high level of spectral efficiency with regard to signal strength near sector borders within the region. Because waveforms are identical, an aggregate of two or more such signals can be received by a receiver 1108 and demodulated without requiring receiver 1108 to demodulate separate signals prior to signal energy aggregation.

An MSBC algorithm data store 1112 can be operatively coupled to each of zone generator 1104 and MSBC paging channel generator. The algorithm data store can store information related to region paging lists, zone page lists, channel generation algorithms, dynamic zone generation algorithms, and/or any other suitable information.

MSBC regional server 1102 additionally comprises a scheduler component 1114 that can facilitate assigning transmission time slots to MSBC paging channels zones, and the like. By requiring each paging channel to transmit pages in a different time slot, paging signals can be disjoined in time to reduce interference there between. In this manner, zones utilizing different MSBC paging channels can be permitted to overlap to provide more than one paging channel to a particular geographical area, which in turn permits increased paging capacity. The scheduling component can employ synchronization techniques to ensure that like channels transmit simultaneously and disparate channels transmit in different time slots.

Figure 12:
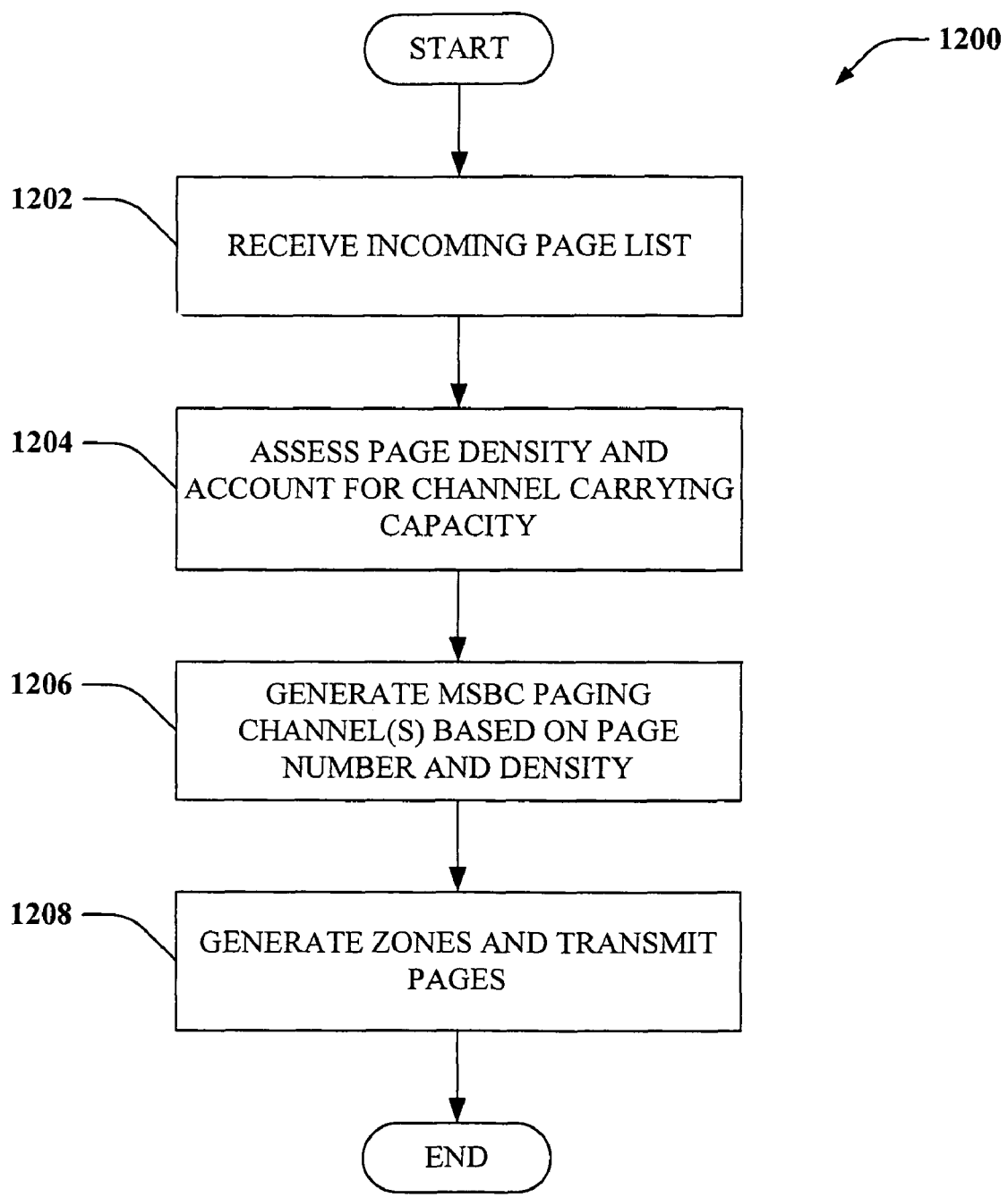
FIG. 12 illustrates a methodology for generating a plurality of MSBC paging channels that can be employed to transmit a plurality of pages to dynamically generated paging zones in one or more regions of a wireless communication network according to an embodiment.
Figure 13:
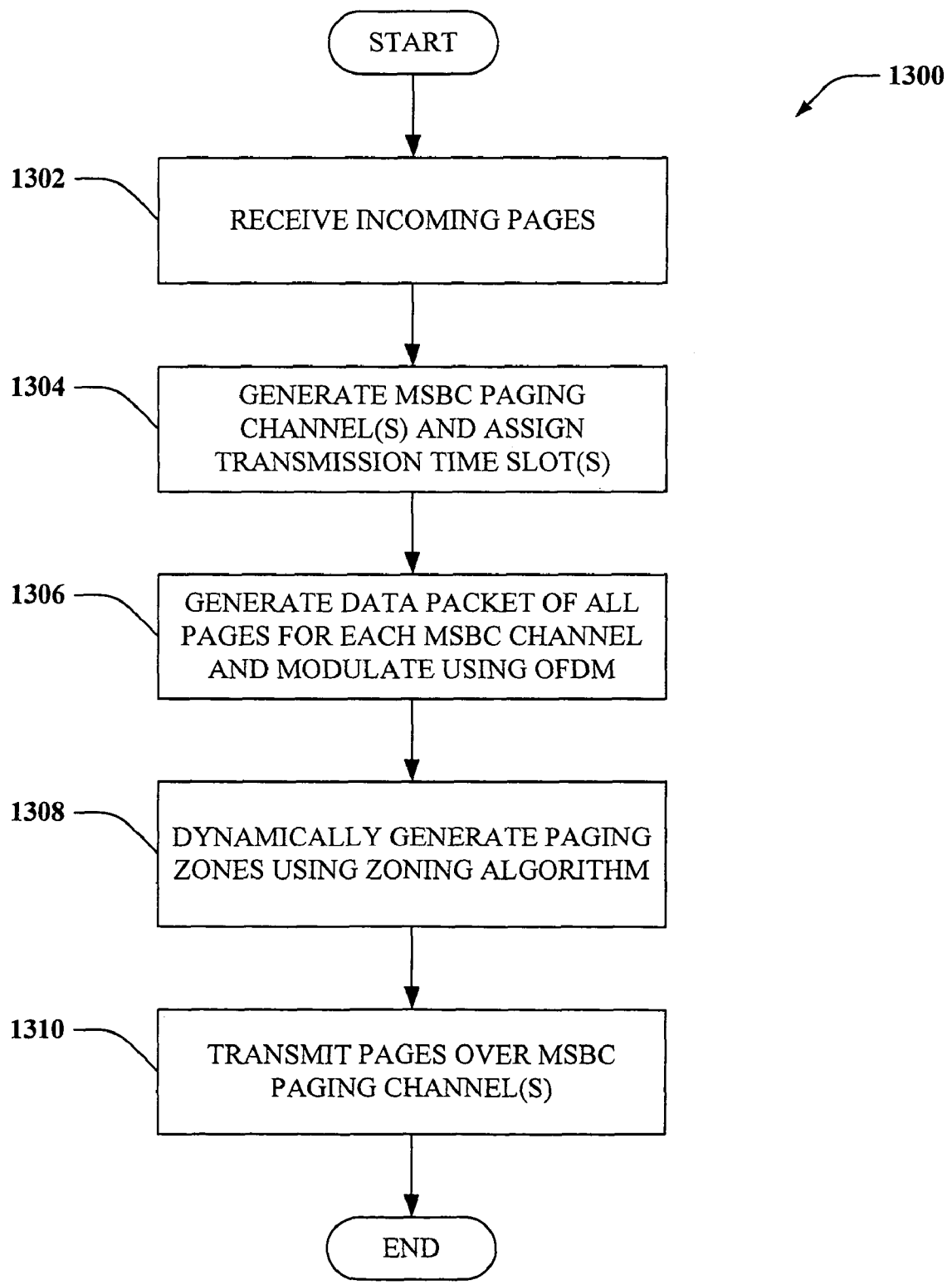
FIG. 13 illustrates a methodology for dynamically generating MSBC paging zones that employ MSBC paging channels to mitigate interference and increase spectral efficiency across a paging region in a wireless communication network according to an embodiment.
Figure 14:
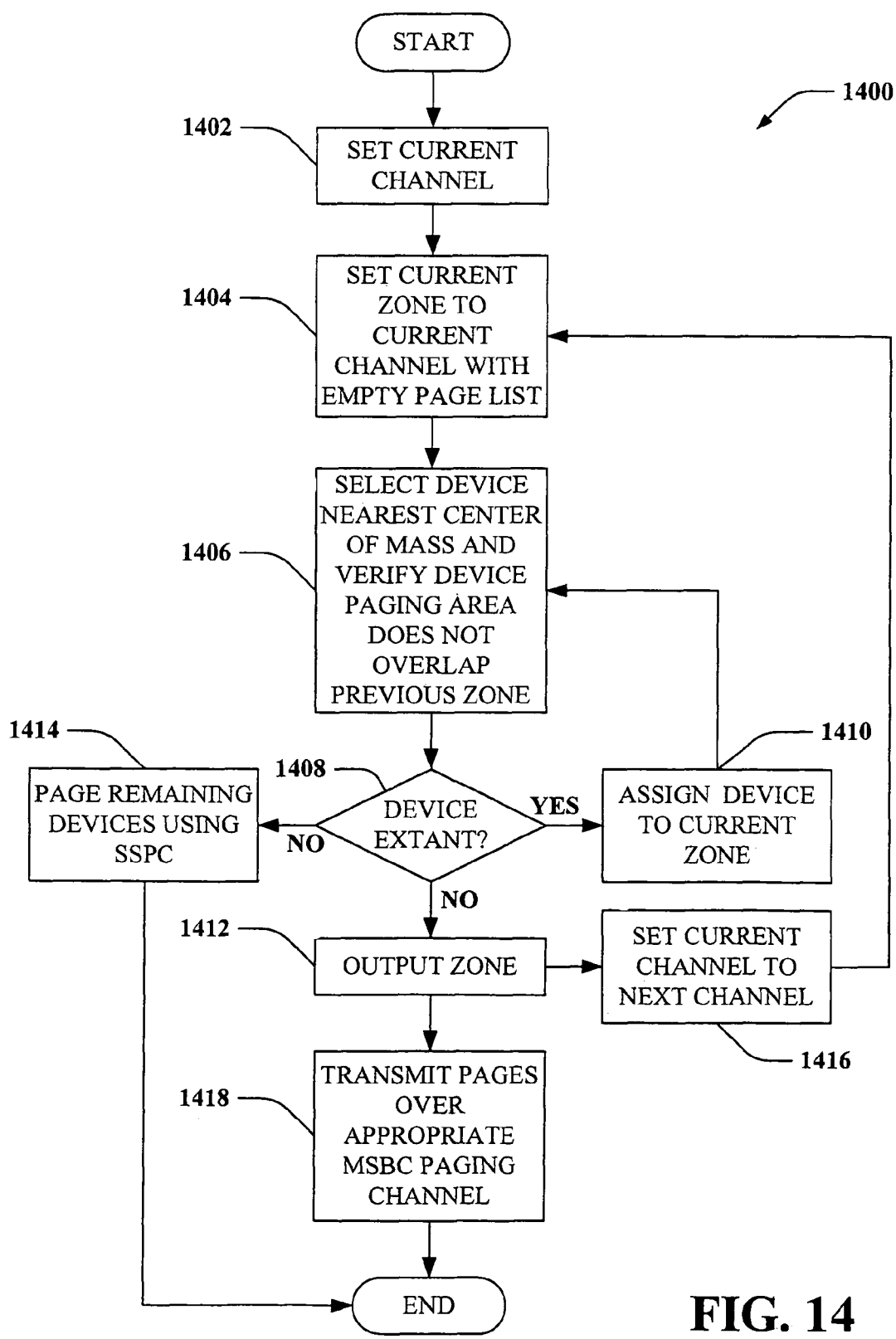
FIG. 14 illustrates a methodology for dynamically generating paging zones within a region of a wireless network according to an embodiment.

Referring to FIGS. 12-14, methodologies relating to generating coarse estimates of wireless symbol boundaries in time domain are illustrated. For example, methodologies can relate to generation of one or more multi-sector broadcast paging channels and/or dynamic paging zones in an OFDM environment, an OFDMA environment, a CDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 12 illustrates a methodology 1200 for generating a plurality of MSBC paging channels that can be employed to transmit a plurality of pages to dynamically generated paging zones in one or more regions of a wireless communication network. According to the method 1200, at 1202, information related to a list of incoming pages for mobile devices registered in a region can be received. At 1204, incoming page information can be analyzed to determine, for example, page density in various areas of the paging region. Each listed mobile device to be paged can be represented by a point-radius pair, such as can be employed in conjunction with a distance-based registration scheme, wherein "point" information comprises the last known registration coordinates and/or sector of a corresponding access terminal, and "radius" information describes a registration distance for the access terminal (e.g., a maximum permissible displacement from the point without requiring reregistration).

Based at least in part on information assessed at 1204 regarding number of mobile devices to be paged, one or more MSBC channels can be generated. For example, a number of MSBC paging channels can be determined based on the total number of pages to be transmitted in view of paging channel capacity. For instance, if a paging channel can carry 500 pages and 1300 pages are to be transmitted, then three paging channels can be generated at 1206. At 1208, one or more paging zones can be dynamically generated, wherein each zone has associated with it a list of channel-access mobile device pair information. The paired data in the mobile device paging list received at 1202 can comprise, for example, a unique subset of the input mobile device list wherein each mobile device in the subset is identified and associated with one or more channels, generated at 1206, by which the mobile device can be paged at 1208. Additionally, devices to be paged in sectors near region borders can be paged over an SSPC paging channel as a precautionary measure to ensure that pages are received by such devices. In this manner, the method 1200 can dynamically assign paging channels to zones generated at each transmission time to facilitate improving spectral efficiency throughout a paging region while mitigating demands on network resources (e.g., bandwidth, required transmission power, . . . ).

FIG. 13 illustrates a methodology 1300 for dynamically generating MSBC paging zones that employ MSBC paging channels to mitigate interference and increase spectral efficiency across a paging region in a wireless communication network. At 1302, a list of mobile devices in a paging region can be received, as described with regard to previous figures. At 1304, MSBC paging channels can be generated in number sufficient to transmit all pages identified in 1302, in view of channel capacity. Additionally, each paging channel can be assigned a specific transmission time slot so that channel transmissions are disjoint in time to mitigate potential interference. At 1306, a data packet comprising pages to be transmitted can be generated for each paging channel, and can be modulated using, for example, an OFDM modulation technique.

At 1308, one or more paging zones can be defined and assigned a paging channel over which to transmit a corresponding encoded and modulated paging data packet to mobile devices within the zone. A zoning algorithm, such as described with regard to FIG. 10 can be employed to generate a subset of wireless devices to be paged from the regional page list received at 1302. At 1310, page subsets can be transmitted in respective zones using an MSBC paging channel assigned to the zone. A single paging channel can be employed for multiple zones so long as zones do not overlap. Where two or more dynamically generated paging zones overlap, each zone can employ different paging channels. Because paging channels are assigned transmission time slots at 1304, interference between two different paging channels transmitted in overlapping portions of their respective zones can be minimized (e.g., different paging signals are not simultaneously present in the overlapping portions and therefore cannot interfere with one another). In this manner, the method 1300 facilitates improving spectral efficiency and dynamically generating paging zones that can employ a plurality of MSBC paging channels to improve region-wide paging capability.

FIG. 14 illustrates a methodology 1400 for dynamically generating paging zones within a region of a wireless network. At 1402, a current MSBC channel can be selected for assignment to a zone. For example, an MSBC paging channel (e.g., channel A) can be generated and set. At 1404, a current zone can be generated and assigned the current MSBC paging channel (e.g., channel A), over which it can transmit pages assigned to it, and a page list comprising information related to devices to be paged can be initiated and set to an empty status. At 1406, devices to be paged can be assigned to the current zone for transmission over the MSBC paging channel. For example, while pages to be transmitted to devices in the paging region are retained in an input list, a determination can be made regarding whether the current dynamic zone. To fill the current zone's page list, a device can be selected from the device page input list, wherein the selected device has a registration point closest to a center of mass of all device registration points in the current dynamic zone being generated, and a paging area (e.g., as described with regard to FIG. 8) that does not overlap with any previously generated zone. At 1408, a determination can be made regarding whether such a device exists (e.g., whether there is a device left in the input list that has a registration point within the current zone and a paging area that does not overlap a previously generated, co-existing zone.

If such device is determined to be present at 1408, then at 1410, the device can be assigned to the current zone (e.g., a device page list for the current zone that is a subset of all pages to be transmitted to devices in the entire region). The method can then revert to 1406 for another iteration of device selection to populate the zone page list. If no such device is detected and/or if the zone is at capacity (e.g., the zone page list is populated to maximum transmission capacity for the MSBC paging channel assigned to the zone), then at 1412, the zone can be output, which can trigger transmitting pages for all devices in the zone page list over the MSBC paging channel assigned to the zone, at 1418. Upon outputting the zone for transmission of pages listed therein at 1412, the method can proceed to 1416, where a next MSBC paging channel can be set as a current channel for assignment to a dynamic zone. The method can then revert to 1404, where the new current channel can be assigned to a new current dynamic paging zone with an empty device page list, and the method can continue through any number of iterations to provide constant dynamic paging zone generation for transmitting pages to users of a wireless network.

Additionally, a determination that no selectable device is present at 1408 can be a result of a failure of a device to meet either of the two constraints described at 1406. For example, the determination can be based on an absence of any further wireless devices to be paged in the region page list. Additionally, devices to be paged can still be present in the page list, but can have paging areas that overlap with a co-existing zone. Such devices can be paged over an SSPC paging channel at 1414 to ensure that all pages in the page list are transmitted to respective intended recipient devices.

Figure 15:
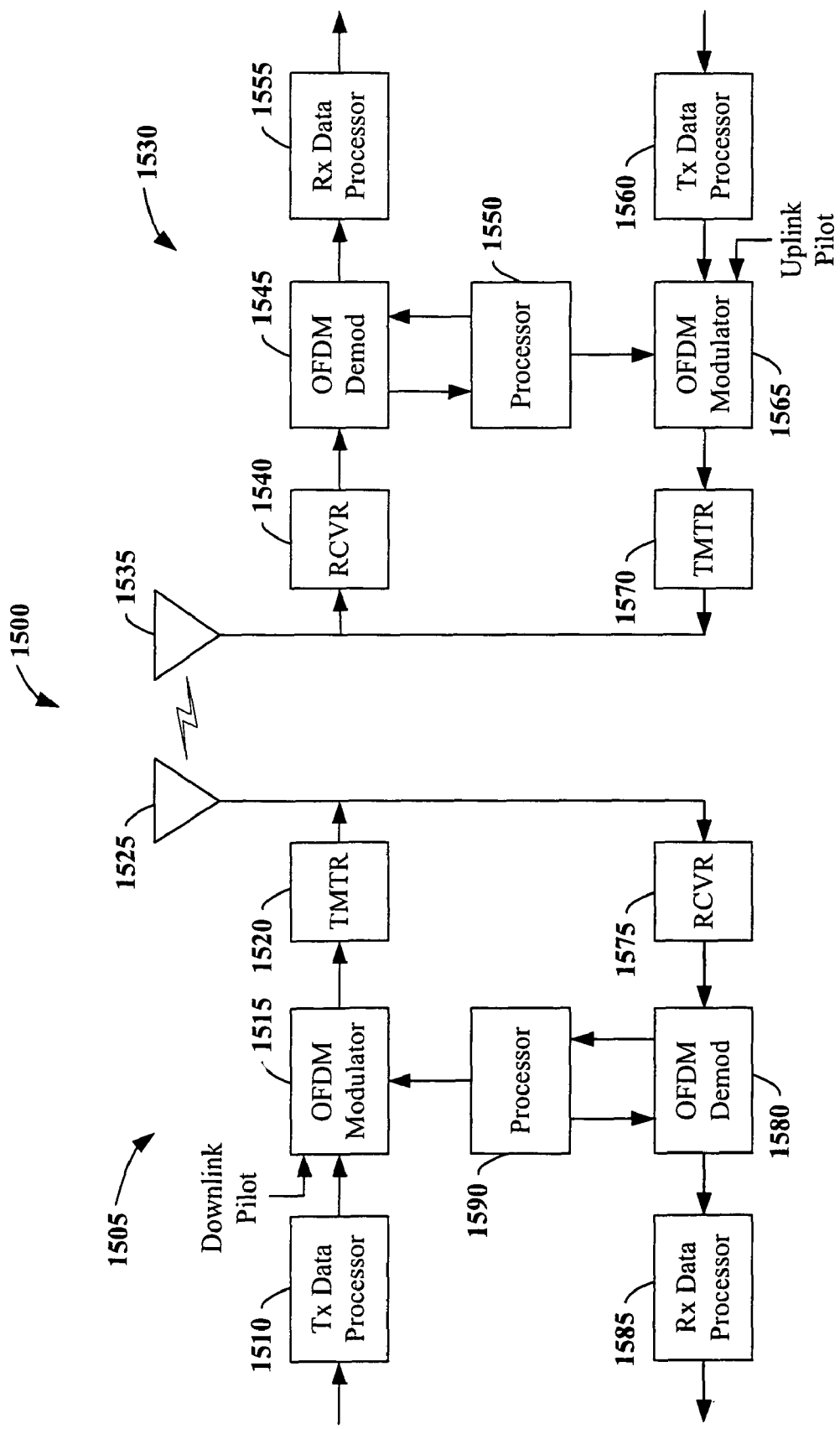
FIG. 15 is an exemplary communication system that can operate in a wireless environment according to an embodiment.

FIG. 15 shows an exemplary wireless communication system 1500. The wireless communication system 1500 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 9-11) and/or methods (FIGS. 12-14), as well as other aspects related to other figures described herein to facilitate wireless communication there between.

Referring now to FIG. 15, on a downlink, at access point 1505, a transmit (TX) data processor 1510 receives, formats, codes, interleaves, and modulates (or symbol maps) traffic data and provides modulation symbols ("data symbols"). An OFDM modulator 1515 receives and processes the data symbols and pilot symbols and provides a stream of OFDM symbols. An OFDM modulator 1520 multiplexes data and pilot symbols on the proper subbands, provides a signal value of zero for each unused subband, and obtains a set of N transmit symbols for the N subbands for each OFDM symbol period. Each transmit symbol may be a data symbol, a pilot symbol, or a signal value of zero. The pilot symbols may be sent continuously in each OFDM symbol period. Alternatively, the pilot symbols may be time division multiplexed (TDM), frequency division multiplexed (FDM), or code division multiplexed (CDM). OFDM modulator 1520 can transform each set of N transmit symbols to the time domain using an N-point IFFT to obtain a "transformed" symbol that contains N time-domain chips. OFDM modulator 1520 typically repeats a portion of each transformed symbol to obtain a corresponding OFDM symbol. The repeated portion is known as a cyclic prefix and is used to combat delay spread in the wireless channel.

A transmitter unit (TMTR) 1520 receives and converts the stream of OFDM symbols into one or more analog signals and further conditions (e.g., amplifies, filters, and frequency upconverts) the analog signals to generate a downlink signal suitable for transmission over the wireless channel. The downlink signal is then transmitted through an antenna 1525 to the terminals. At terminal 1530, an antenna 1535 receives the downlink signal and provides a received signal to a receiver unit (RCVR) 1540. Receiver unit 1540 conditions (e.g., filters, amplifies, and frequency downconverts) the received signal and digitizes the conditioned signal to obtain samples. An OFDM demodulator 1545 removes the cyclic prefix appended to each OFDM symbol, transforms each received transformed symbol to the frequency domain using an N-point FFT, obtains N received symbols for the N subbands for each OFDM symbol period, and provides received pilot symbols to a processor 1550 for channel estimation. OFDM demodulator 1545 further receives a frequency response estimate for the downlink from processor 1550, performs data demodulation on the received data symbols to obtain data symbol estimates (which are estimates of the transmitted data symbols), and provides the data symbol estimates to an RX data processor 1555, which demodulates (e.g., symbol demaps), deinterleaves, and decodes the data symbol estimates to recover the transmitted traffic data. The processing by OFDM demodulator 1545 and RX data processor 1555 is complementary to the processing by OFDM modulator 1515 and TX data processor 1510, respectively, at access point 1500.

On the uplink, a TX data processor 1560 processes traffic data and provides data symbols. An OFDM modulator 1565 receives and multiplexes the data symbols with pilot symbols, performs OFDM modulation, and provides a stream of OFDM symbols. The pilot symbols may be transmitted on subbands that have been assigned to terminal 1530 for pilot transmission, where the number of pilot subbands for the uplink may be the same or different from the number of pilot subbands for the downlink. A transmitter unit 1570 then receives and processes the stream of OFDM symbols to generate an uplink signal, which is transmitted by the antenna 1535 to the access point 1510.

At access point 1510, the uplink signal from terminal 1530 is received by the antenna 1525 and processed by a receiver unit 1575 to obtain samples. An OFDM demodulator 1580 then processes the samples and provides received pilot symbols and data symbol estimates for the uplink. An RX data processor 1585 processes the data symbol estimates to recover the traffic data transmitted by terminal 1535. A processor 1590 performs channel estimation for each active terminal transmitting on the uplink. Multiple terminals may transmit pilot concurrently on the uplink on their respective assigned sets of pilot subbands, where the pilot subband sets may be interlaced.

Processors 1590 and 1550 direct (e.g., control, coordinate, manage, etc.) operation at access point 1510 and terminal 1535, respectively. Respective processors 1590 and 1550 can be associated with memory units (not shown) that store program codes and data. Processors 1590 and 1550 can also perform computations to derive frequency and impulse response estimates for the uplink and downlink, respectively.

For a multiple-access OFDM system (e.g., an orthogonal frequency division multiple-access (OFDMA) system), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1590 and 1550.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of providing communication service over a wireless network, comprising:
   assessing a page list of devices to be paged in a paging region and a paging area for each device in the page list;
   assigning one or more paging channels unique transmission time slots to minimize interference between each sector based at least in part on a number of devices to be paged in each sector, wherein at least one paging channel is assigned to multiple sectors; and
   transmitting, from a single waveform, pages on a single frequency to a subset of devices to be paged in each sector over the at least one paging channel assigned to multiple sectors to provide improved paging signal spectral efficiency within a transmission sector and mitigate coverage gaps at or near sector boundaries.

2. The method of claim 1, further comprising transmitting a sector overhead message from each sector comprising information related to an identity the at least one paging channel assigned to multiple sector transmitted over the sector.

3. The method of claim 1, further comprising modulating paging messages for devices to be paged using an orthogonal frequency division multiplexing modulation technique.

4. The method of claim 1, further comprising assigning transmission time slots to each at least one paging channel assigned to multiple sectors.

5. The method of claim 1, further comprising transmitting pages over a single sector paging channel in sectors at edges of the region.

6. The method of claim 1, further comprising dynamically generating paging zones within the region.

7. The method of claim 6, the page list of devices to be paged identifies each device by a point-radius data pair.

8. The method of claim 7, the point data describes a last registration location for the device, and the radius data describes a registration distance for the device.

9. The method of claim 8, generating a dynamic paging zone comprises receiving the page list and generating a zone list comprising channel-device data pairs that associates one or more devices in the page list with a transmission channel over which the one or more devices will be paged.

10. The method of claim 9, the transmission channel is at least one of the at least one paging channel assigned to multiple sectors and a single-sector paging channel.

11. The method of claim 9, the zone list is a subset of devices described in the page list for the region.

12. The method of claim 6, further comprising generating a plurality of zones that transmit pages over the same at least one paging channel assigned to multiple sectors.

13. The method of claim 12, further comprising geographically isolating zones that transmit pages over the same at least one paging channel assigned to multiple sectors to mitigate inter-channel interference.

14. The method of claim 6, further comprising generating a plurality of zones, each of which transmits pages over a different at least one paging channel assigned to multiple sectors.

15. The method of claim 14, further comprising overlapping zones that transmit pages over different paging channels to increase page transmission capacity in overlapped areas of the zones.

16. The method of claim 1, wherein the at least one paging channel assigned to multiple sectors is a multi-sector broadcast (MSBC) paging channel.

17. An apparatus that facilitates generating dynamic paging zones within a region in a wireless communication network, comprising:
a region server that receives an input list of devices to be paged having an identical waveform on a single frequency in the region;
a channel generator that creates a plurality of paging channels, for transmitting from a single waveform, pages in the region;
a zone generator that assigns a selected paging channel to an empty zone and populates the zone with a subset of devices identified in the input list; and
wherein said region server further comprises a scheduling component that temporally disjoins paging channels by assigning unique transmission time slots to each paging channel to differentiate each paging channel to provide improved paging signal spectral efficiency within a transmission sector and mitigate coverage gaps at or near sector boundaries.

18. The apparatus of claim 17, the region server employs a distance-based registration mechanism to identify a location of a device in the input list.

19. The apparatus of claim 18, the zone generator populates the zone by selecting a device from the input list with a registration point closest to a center of mass of all devices in the input list for the region and verifies that registration radius for the selected device does not overlap with a previously generated and co-existing zone.

20. The apparatus of claim 19, the zone generator assigns the selected device to the zone.

21. The apparatus of claim 20, further comprising at least one transmitter that transmits pages for devices in the zone over the paging channel assigned to the zone.

22. The apparatus of claim 21, the region server identifies one or more devices in the input list that have a registration radius that overlaps a previously generated and co-existing zone.

23. The apparatus of claim 22, the at least one transmitter transmits a page to the one or more identified devices over a single sector paging channel.

24. The apparatus of claim 17, the zone generator outputs the zone when the zone is fully populated and transmits pages to devices assigned to the zone through at least one transmitter in the region.

25. The apparatus of claim 24, the zone generator defines a population maximum for devices assigned to the zone based at least in part on a transmission capacity of the paging channel assigned to the zone.

26. The apparatus of claim 25, the zone generator selects a new and different paging channel upon outputting the zone.

27. The apparatus of claim 26, paging channels are multi-sector broadcast paging channels.

28. The apparatus of claim 26, the zone generator assigns the new paging channel to a new empty zone, populates the new zone with remaining devices in the input list, and outputs the new zone for transmission upon reaching a population maximum for the new zone.

29. A system that facilitates generating a plurality of dynamic paging channel transmission zones in a wireless network region to obtain improved signal spectral efficiency within a transmission sector and mitigate coverage gaps at or near sector boundaries, comprising:
a server that receives input information related to incoming pages for devices in a wireless network region; and
a zone generation component that assigns a paging channel to at least one zone and populates the at least one zone with a subset of devices to be paged on a single frequency, wherein said region server further comprises a scheduler component that assigns unique transmission time slots to each paging channel and mitigates inter-channel interference between paging channels to provide improved paging signal spectral efficiency within a transmission sector and mitigate coverage gaps at or near sector boundaries.

30. The system of claim 29, the region comprises a plurality of sectors, each of which has a base station that transmits pages over a channel assigned to a zone to which the sector is assigned during a paging cycle.

31. The system of claim 30, the zone generation component generates a plurality of overlapping zones with different paging channel assignments.

32. The system of claim 31, one or more sectors are located in a zone-overlap area.

33. The system of claim 32, base stations in the one or more sectors located in the zone-overlap area transmit pages to device subsets over each different paging channel assigned to each respective zone in the plurality of zones.

34. The system of claim 30, each sector base station transmits a sector overhead message that identifies one or more paging channels broadcast over the sector.

35. The system of claim 34, the one or more paging channel is at least one of an MSBC paging channel and a single sector-paging channel.

36. The system of claim 29, a base station in a sector at a region edge transmits pages over both a multi-sector broadcast paging channel and a single-sector paging channel to increase page signal availability for a device at the region edge.

37. An apparatus that facilitates providing multiple paging channels page transmission in a wireless network environment, comprising:

means for receiving a page list comprising information related to devices to be paged in a network region;

means for parsing the page list into subsets of devices according to device density in one or more geographical areas of the region;

means for generating paging zones with unique paging channels that are disjointed in time to mitigate interference; and means for transmitting from a single waveform pages on a single frequency to subsets of devices in respective paging zones to provide improved paging signal spectral efficiency within a transmission sector and mitigate coverage gaps at or near sector boundaries.

38. The apparatus of claim 37, further comprising means for overlapping paging zones employing different paging channels to meet paging demands in geographical areas were device density exceeds a transmission capacity of one or more paging channels.

39. The apparatus of claim 37, further comprising means for transmitting pages over each of a single-sector paging channel and a multi-sector broadcast paging channel in sectors at a perimeter of the region.

40. The apparatus of claim 37, further comprising means for temporally coordinating page broadcasts to subsets of devices throughout the region.

41. The apparatus of claim 37, further comprising means for modulating paging data in a paging channel transmission.

42. The apparatus of claim 41, the means for modulating paging data comprising an orthogonal frequency division multiplexing modulation technique.

43. The apparatus of claim 37, further comprising means for generating a sector overhead message that indicates one or more channels over which a sector in a zone is transmitting pages, the one or more channels comprise at least one of a single-sector broadcast paging channel and one or more multi-sector broadcast paging channels.

44. A non-transitory computer-readable medium having stored thereon computer-executable instructions over a wireless network, by:

identifying devices to be paged in a wireless communication paging region;

identifying at least one paging channel assigned unique transmission time slots to minimize interference between multiple sectors for transmission of pages from a single waveform;

generating a dynamic paging zone associated with the at least one paging channel assigned to multiple sectors; and populating the dynamic paging zone with a subset of identified devices to be paged on a single frequency with identical waveforms to provide improved paging signal spectral efficiency within a transmission sector and mitigate coverage gaps at or near sector boundaries.

45. The non-transitory computer-readable medium of claim 44, further comprising computer-executable instructions for registering devices in the region utilizing a distance-based registration mechanism.

46. The non-transitory computer-readable medium of claim 44, further comprising computer-executable instructions for populating the dynamic paging zone with devices located in areas of the region where device concentration is highest.

47. The non-transitory computer-readable medium of claim 44, further comprising computer-executable instructions for transmitting pages to devices populating the dynamic paging zone over the at least one paging channel assigned to multiple sectors.

48. The non-transitory computer-readable medium of claim 44, further comprising computer-executable instructions for transmitting paging messages to devices not populating the dynamic paging zone over a single-sector paging channel.

49. The non-transitory computer-readable medium of claim 44, wherein the at least one paging channel assigned to multiple sectors is a multi-sector broadcast (MSBC) paging channel.

50. A microprocessor that executes instructions over a wireless network by dynamically generating paging zones, the instructions comprising:

identifying all devices to be paged in a paging region of a wireless communication network;

assigning a multi-sector broadcast (MSBC) paging channel to a zone;

assigning a subset of all devices to be paged to the zone, the subset is based at least in part on device density and paging channel transmission capacity;

transmitting pages on a single waveform to devices assigned to the zone over the MSBC paging channel assigned to the zone; and further comprising instructions for assigning unique transmission time slots to each MSBC paging channel to provide improved paging signal spectral efficiency within a transmission sector and mitigate coverage gaps at or near sector boundaries.

51. The microprocessor of claim 49, further comprising instructions for registering devices in the region utilizing a distance-based registration mechanism.

52. The microprocessor of claim 49, further comprising instructions for populating a dynamic paging zone with devices located in areas of the region where device concentration is highest.

53. The microprocessor of claim 51, further comprising instructions for transmitting paging messages to devices not populating the dynamic paging zone over a single-sector paging channel.

54. The microprocessor of claim 49, further comprising instructions for dynamically generating paging zones within the paging region.

* * * * *